United States Patent [19]

Okumura

[11] E Patent Number: Re. 33,738

[45] Reissued Date of Patent: Nov. 12, 1991

[54] ELECTRONIC MUSICAL INSTRUMENT OF WAVEFORM MEMORY READING TYPE

[75] Inventor: Takatoshi Okumura, Hamamatsu, Japan

[73] Assignee: Yamaha Corporation, Hamamatsu, Japan

[21] Appl. No.: 828,081

[22] Filed: Feb. 7, 1986

Related U.S. Patent Documents

Reissue of:

[64] Patent No.: 4,377,960
Issued: Mar. 29, 1983
Appl. No.: 145,111
Filed: Apr. 30, 1980

U.S. Applications:

[63] Continuation of Ser. No. 620,391, Jun. 13, 1984, abandoned.

[51] Int. Cl.[5] ..... G10H 1/08; G10H 1/12; G10H 7/04

[52] U.S. Cl. ..... 84/605; 84/622; 84/625

[58] Field of Search ..... 84/600-607, 84/622-625, DIG. 9

[56] References Cited

U.S. PATENT DOCUMENTS

| | | | |
|---|---|---|---|
| 3,882,751 | 5/1975 | Tomisawa et al. | 84/1.01 |
| 4,036,096 | 7/1977 | Tomisawa et al. | 84/1.01 |
| 4,085,644 | 4/1978 | Deutsch et al. | 84/1.01 |
| 4,138,915 | 2/1979 | Nagai . | |
| 4,179,972 | 12/1979 | Hiyoshi et al. | 84/1.01 X |
| 4,254,681 | 3/1981 | Kugisawa et al. | 84/1.01 |
| 4,282,785 | 8/1981 | Obayashi et al. | 84/1.01 |
| 4,333,374 | 6/1982 | Okumura et al. | 84/1.01 |
| 4,338,674 | 7/1982 | Hamada | 84/1.01 X |
| 4,345,500 | 8/1982 | Alonso et al. | 84/1.01 |
| 4,475,431 | 10/1984 | Kashio | 84/1.01 X |
| 4,619,174 | 10/1986 | Okumura . | |

FOREIGN PATENT DOCUMENTS 52-3421 1/1977 Japan .

*Primary Examiner*—Stanley J. Witkowski
*Attorney, Agent, or Firm*—Spensley Horn Jubas & Lubitz

[57] ABSTRACT

An electronic musical instrument includes a plurality of address generators for producing address signals corresponding to different tones each varying at a rate synchronous with the frequency of each of the different tones, a waveform memory device including a plurality of addresses for storing at respective addresses a plurality of waveform sample values that constitute a waveform, a circuit for sequentially supplying one after another of the address signals to the waveform memory device to read out the waveform in different rates in a time division multiplexed manner for different tones, and musical tone forming circuits for forming musical tones in accordance with the time division multiplexed waveform outputs of the waveform memory device.

9 Claims, 16 Drawing Sheets

ELECTRONIC MUSICAL INSTRUMENT OF WAVEFORM MEMORY READING TYPE

Matter enclosed in heavy brackets [ ] appears in the original patent but forms no part of this reissue specification; matter printed in italics indicates the additions made by reissue. *This application is a continuation of application Ser. No. 06/620,391 filed Jun. 13, 1984 and now abandoned which is a reissue of application Ser. No. 06/145,111 filed Apr. 30, 1980 and now U.S. Pat. No. 4,377,960.*

BACKGROUND OF THE INVENTION

This invention relates to an electronic musical instrument of a waveform memory reading type, and more particularly to a polyphonic electronic musical instrument having a plurality of tone production channels.

A polyphonic electronic musical instrument, particularly an electronic musical instrument of the digital processing type is provided with a plurality of tone production channels and key information of a depressed key is assigned to one of the tone production channels by a key assigner for producing a musical tone by the assigned tone production channel in accordance with the key information. As a method of generating the musical tone by the designated tone production channel, there is known a method of reading out a musical tone waveform from a waveform memory device. In one example, a plurality of tone production channels are connected in parallel on a non time division basis and independent waveform memory devices are provided for respective channels. In this system, however, it is necessary to provide elements required for forming a musical tone for every channel. Especially, the waveform memory device provided for each channel has a relatively complicated construction so that provision of such a waveform memory device for each channel not only increases the size of the circuit construction of the electronic musical instrument but also increases the cost of manufacture. Moreover, in order to enable switching between waveforms (switching between tone colors) it is necessary to provide a plurality of waveform memory devices for each channel which makes it difficult to simply switch waveforms (tone colors) without increasing the manufacturing cost and circuit construction size.

According to one approach to these problems, a plurality of tone production channels are formed on a time division basis so as to use commonly one waveform memory device for respective channels on the time division basis. This system is disclosed, for example, in U.S. Pat. No. 3,882,751 dated May 13, 1975. When compared with the aforementioned system, this system is advantageous in that it can save the manufacturing cost and the number of component elements but as the time division frequency is set independently of the musical tone frequency, the musical tone waveform read out on the time division basis contains non-harmonic tones thus distorting the tone produced. Generally, since the time division frequency is in a range higher than audible frequencies it does not act as a non-harmonic tone component but as is apparent from sampling theorem, where a musical tone wave of an especially high frequency is read out on the time division basis an aliasing (frequency reflection) noise which is not harmonic with the musical tone frequency might be generated. In addition to the problem of the aliasing noise, when the time division time slots change instantaneously for the respective channels, the musical tone waveform sampling amplitudes interfere with each other between adjacent channels at every time slot, thus distorting the waveform and making the tone unclear.

SUMMARY OF THE INVENTION

Accordingly, it is an object of this invention to provide an electronic musical instrument which can simplify as far as possible the circuit construction of the instrument thus decreasing the cost and yet can produce distortionless clear tones.

Another object of this invention is to provide an electronic musical instrument, which in spite of using a time division system, can prevent interference between tone production channels and can produce a clear musical tone devoid of such non-harmonic components as aliasing noise.

A further object of this invention is to provide an improved electronic musical instrument which can produce various musical tone waveforms with waveform memory devices of a small size thereby decreasing the size of the circuit as well as the manufacturing cost.

According to this invention, these and further objects can be accomplished by providing an electronic musical instrument comprising a plurality of address generators respectively producing address signals which vary corresponding to different tones at rates respectively synchronous with frequencies of the respective tones, a waveform memory device including a plurality of addresses for respectively storing a plurality of waveform sample values that constitute a waveform at respective ones of the addresses, means for sequentially supplying one after another of the address signals sent from the address generators to the waveform memory device thereby reading out the stored waveform at different rates in a time division multiplexing manner respectively corresponding to said address signals supplied for different tones to be produced, and musical tone forming means for forming musical tones in accordance with the respective time division multiplexed waveform outputs, from the waveform memory device.

DESCRIPTION OF THE PREFERRED EMBODIMENTS

Figure 1:
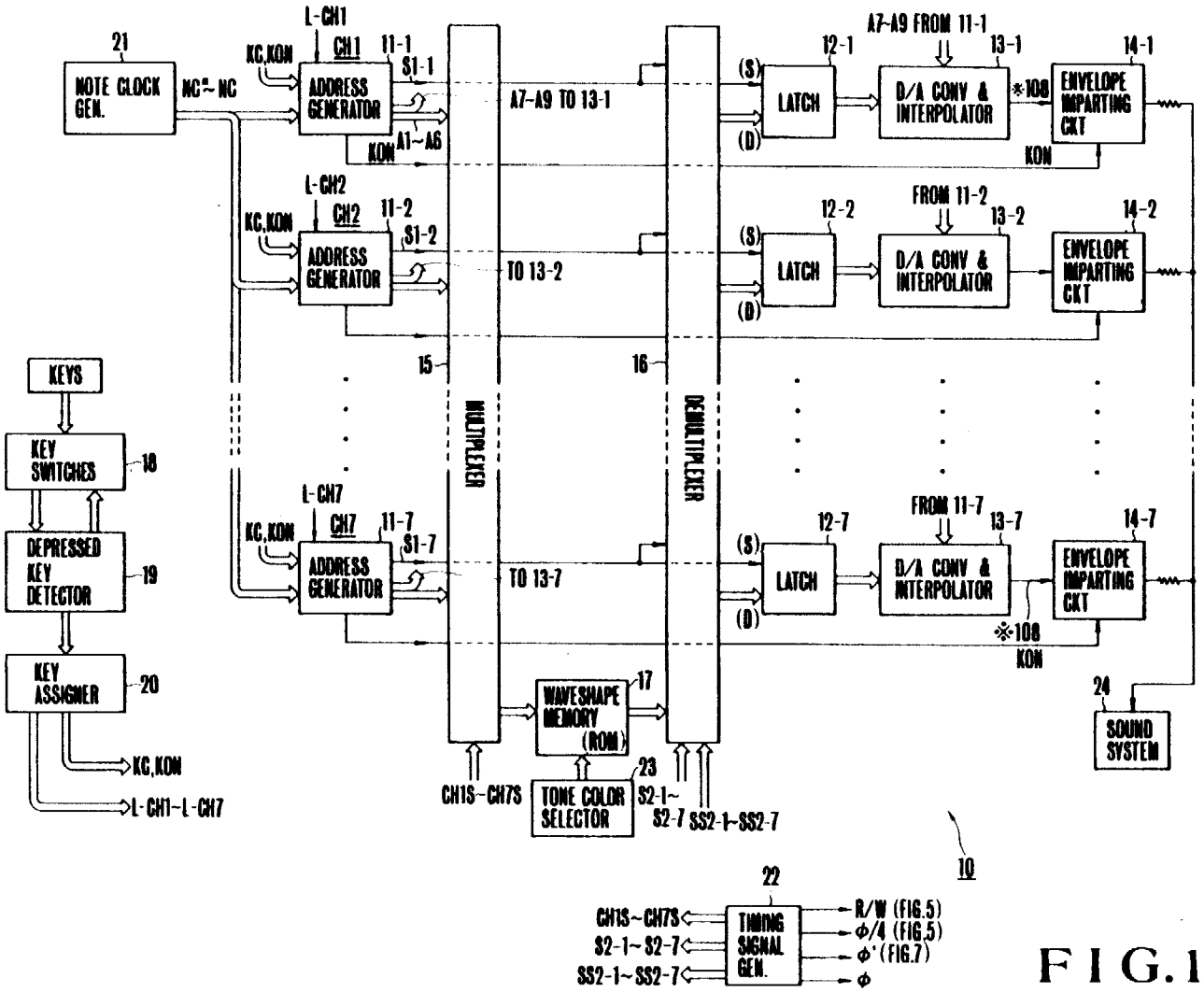
FIG. 1 is a general block diagram showing one embodiment of the electronic musical instrument embodying the invention.

An electronic musical instrument 10 shown in FIG. 1 comprises seven tone production channels CH1 through CH7, respectively including address generators 11-1 through 11-7, latch circuits 12-1 through 12-7, digital-analog converter and interpolator circuits 13-1 through 13-7, and envelope imparting circuits 14-1 through 14-7. Between the address generators 11-1 through 11-7 and the latch circuits 12-1 through 12-7 is interposed a waveform memory device 17 via a multiplexer 15 and a demultiplexer 16, the waveform memory device 17 being used commonly on a time division basis by respective channels CH1 through CH7.

A depressed key detector 19 detects key switches corresponding to the depressed keys among key switches 18 so as to supply key information representing the depressed keys to a key assigner. In response to the depressed key information given by the depressed key detector 19, the key assigner 20 assigns the tones of the depressed keys to available ones to the channels CH1 through CH7. The key assigner 20 produces key codes KC representing respective keys assigned to respective ones of the channels CH1 through CH7 and key-on signals KON representing the ON/OFF states of the respective keys, and these key codes and key-on signals are distributed among corresponding address generators 11-1 through 11-7.

The address generators 11-1 through 11-7 are used to generate address signals of nine bits A1 through A9, for example, for reading out musical tone waveforms of desired frequencies from the waveform memory device 17. Respective address generators 11-1 through 11-7 generate signals S1-1 through S1-7 synchronously with the variation (progress) in the values of the address signals A1 through A9. Furthermore, tone source clock generator 21 is provided to produce note clock signals NC# through NC corresponding to the pitches of respective notes C#, D, D#. . . A#, B and C, the note clock signals NC# through NC being supplied to address generators 11-1 through 11-7 respectively for generating address signals A1 through A9 based on the key code KC supplied from the key assigner 20 and the note clock signals NC# through NC, the address signals repeatedly increasing or decreasing their values at a frequency proportional to the tone pitch of the depressed key assigned to respective channels CH1 through CH7.

A multiplexer or selector 15 is provided to select in a time division multiplexing manner, that is, to multiplex the address signals A1 through A9 generated by the address generators 11-1 through 11-7 respectively corresponding to the channels CH1 through CH7 for supplying in a time division multiplexing manner the selected signals to the address input of the waveform memory device 17. In this embodiment, since the read out waveforms are interpolated, upper order 6 bits A1 through A6 are applied to the multiplexer 15 to act as a read out address signal. A demultiplexer 16 distributes the waveform data (waveform sampling point amplitude data) read out on the time division basis from the waveform memory device 17 among respective channels CH1 through CH7 thus converting the timewise distributed data into sustained signals. A timing signal generator 22 is provided to produce channel selection signals CH1S through CH7S for controlling the multiplexing function of the address signals of respective channels CH1 through CH7 and control signals S2-1 through S2-7 and SS2-1 through SS2-7 for controlling the distribution of the waveform data at the distributor or demultiplexer 16 among respective channels CH1 through CH7.

The waveform memory device 17 is constituted by a plurality of read only memory devices (ROM) in which a plurality of different musical tone waveforms or tone source waveforms are prestored. A tone color selector 23 is provided for selecting a musical tone waveform, i.e., a tone color to be read out from the waveform memory device 17 and the musical tone waveforms or the tone source waveforms selected by the tone color selector 23 are read out by the address signals A1 through A6. The waveforms stored in the waveform memory device 17 may be musical tone waveforms (composite waveforms) corresponding to the desired tone colors, or tone source waveforms (harmonics-rich waveforms) containing a plurality of harmonic components. Where harmonics-rich waveforms are stored, it is necessary to pass them through filters for the purpose of obtaining desired tone colors.

Latch circuits 12-1 through 12-7 function to latch the time-division chopped waveform data of the respective channels which have been distributed and converted into holding signals in synchronism with the tone pitches of the channels thereby eliminating time division clock components. The digital analog converter and interpolator circuits 13-1 through 13-7 operate to convert the waveform data digitally read out of the waveform memory device 17 into analog waveform amplitude voltages and to interpolate suitable waveforms (functions) formed according to the lower order 3 bits A7 to A9 of the address signal between the adjacent sampling points of the analog waveform amplitude voltages. Analog musical tone waveform signals produced by digital-analog converter and interpolator circuits 13-1 through 13-7 are respectively applied to the envelope imparting circuits 14-1 through 14-7 thereby applying amplitude envelope to the musical tone signals according to the key-on signals KON produced by the address generators 11-1 through 11-7. The outputs of the envelope imparting circuits 14-1 through 14-7 of respective channels are mixed together and then applied to a sound system 24.

The detail of address generators 11-1 through 11-7, multiplexer 15, demultiplexer 16, latch circuits 12-1 through 12-7, digital-analog converter and interpolator circuits 13-1 through 13-7 and envelope imparting circuits 14-1 through 14-7 shown in FIG. 1 will now be described with reference to one channel CH1 with the aid of FIG. 2.

Thus, a latch circuit 25 of the address generator 11-1 latches one key code KC and one key-on circuit KON assigned to the given channel CH1 among key codes KC and key-on signals KON supplied from key assigner 20. In this example, as it has been assumed that the key codes KC and the key-on signals KON of the tones assigned to respective channels are generated in a time division manner by the key assigner 20 it is necessary to use such latch circuit 25. However, the latch circuit would not be necessary where the key codes KC and key-on signals KON for respective channels were produced in parallel and continuously from the key assigner 20.

To the strobe input S of the latch circuit 25 is applied a latch control pulse synchronous with the time division timing of the key code KC and the key-on signal of the given channel CH1 from the key assigner 20 or a suitable timing signal generator not shown. The key code KC consists of a note code NOTE indicative of the note name of a tone assigned to the channel CH1, and an octave code OCT indicative of the octave range. The octave code OCT comprises octave signals O1 to O7 respectively corresponding to 7 octave tone ranges of from the first to 7th octave, and only one octave signal (one of O1 through O7) corresponding to an octave to which a depressed key assigned to the channel CH1 belongs is "1" and the others are "0".

The note code NOTE latched by the latch circuit 25 is applied to the selection control input of the note selector 26, and to the selected signal input thereof is applied one of note clock signals NC# through NC from the generator 21, shown in FIG. 1. The note selector 26 selects one note clock signal (one of NC# through NC) corresponding to a note name represented by the note code NOTE. In this example, the note clock generator 21 (FIG. 1) is constructed to produce octave-multiplexed note signals corresponding to the respective note names as disclosed in copending U.S. patent application Ser. No. 915,239 filed by Okamura on June 13, 1978 and having a title of "Submultiple-Related-Frequency Wave Generator" now U.S. Pat. No. 4,228,403 issued Oct. 14, 1980. Thus, respective note clock signals NC# through NC are generated in the form of octave-multiplexed note signals.

One example of the note clock signals NC# through NC selected by the note selector 26 and applied to a line 27, that is the content of the octave-multiplexed note signal is depicted along the line 27. In an octave-multiplexed note signal for one note name, a plurality of binary related digit signals Q1 through Q9 (indicating note wave states for respective octaves) such as would be obtained by sequentially frequency dividing a clock of a high frequency corresponding to the designated note are aligned in serially time divisioned multiplexed state.

Each one of the octave-related digit signals Q1 through Q9 has a frequency of a relationship of $2^n$ with each other. Consequently, in the octave-multiplexed note signal, binary data consisting of a plurality of bits (9 bits) are serially generated. Assume now that Q1 is the least significant bit (LSB) and that its weight is $2^0=1$, then the weight of Q2 is $2^1$, that of Q3 is $2^2$, that of Q8 is $2^7$ and that of the most significant bit (MSB) Q9 is $2^8$. In the octave-multiplexed note signal, a reference timing pulse P is always delivered preceding the first one of the note state digit signals Q1 through Q9.

Among the note state digit signals, whenever the logic level of the highest frequency digit signal Q1 is reversed, the logic levels ("1" or "0") of the respective note state digit signals are serially delivered following the reference timing pulse P. More particularly, for every reversal of the amplitude level of the note state digit signal Q1 of the highest frequency to "1" or "0", the reference timing signal P is delivered in the first time slot (the width thereof is extremely narrow, for example about 1 micro-second). In the next slot time, a data bit indicative of the logic level of the note state digit signal Q1 of the highest frequency of the designated note is allotted. To the succeeding eight (third through tenth) time slots are respectively allotted data representing the logic levels of the note state digit signals Q2 through Q9. Upon termination of the time slot of the last digit signal Q9, the level of the octave-multiplexed note signal is maintained at "0" until the next data delivering time, that is the next reversal of the digit signal Q1 to "1" or "0". Accordingly, if "1" is delivered after the continuation of "0" for the period of at least 9 time slots, this "1" means the reference timing pulse P.

The note clock signal, i.e., the octave-multiplexed note signal selected by the note selector 26 is applied to the first stage of a shift register 28 over line 27. This shift register 28 is of a 10-stage/1-bit type and is driven by a clock pulse $\phi$ (see FIG. 3a) synchronous with the time slots of the note state digit signals. The note state digit signals are written into the shift register 28 in the order of P, Q1, Q2 . . . Q9 and are sequentially shifted toward the last or 10th stage.

A signal produced by inverting the output of the first stage of the shift register 28 with an inverter 29 and the output signals of the second to 10th stages are inputted to a NOR gate circuit 30 which is provided for the purpose of detecting the reference timing pulse P, that is the arrival of the divided frequency data Q1 through Q9. The outputs of the fourth to 10th stages of the shift register 28 are applied to one input of AND gate circuits 31 through 37 respectively which are provided for the purpose of shifting, by amounts corresponding to octave signals O1 through O7, the bit positions of the note state signals Q1 through Q9 which have been arranged in parallel by the shift register 28. Subsequent to this shift control, the parallel data Q1 through Q9 are latched by a latch circuit 38.

The octave signals O1 through O7 outputted from the latch circuit 25 are sequentially inputted to one input of AND gate circuits 31 through 37 starting from the higher octave O7. At this time, since only the octave signals corresponding to the octave range of the note assigned to its channel becomes "1", only one of the AND gate circuits 31 through 37 corresponding to the single octave signal (one of O1 through O7) is now "1". When the first delivered timing signal P of level "1" is shifted to one of the fourth to 10th stages of the shift register 28 corresponding to one AND gate circuit (one of 31 through 37), this AND gate circuit is enabled to apply a signal "1" to the OR gate circuit 39.

The arrival of the note state digit signals Q1 through Q9 in all to constitute a complete octave-multiplexed note signal at the shift register 28 is detected in the following manner.

Since the note state digit signals Q1 to Q9 are always sent out after the reference timing pulse P, no signal ("0") would appear at least for the period of nine bit times before appearance of the reference timing pulse P. Accordingly, when the reference timing pulse P is written into the first stage of the shift register 28, the outputs of the second to 10th stages representing the signal states of the nine bit times preceding the pulse P are all "038 . The inverted signal "0" of the first stage becomes "0" only when the reference timing pulse P is written into the first stage of the shift register 28. Since a NOR gate circuit 30 is supplied with the inverted output of the first stage and the outputs of the second through the 10th stages, it produces an output "1" at this time. The output "1" of the NOR gate circuit 30 is applied to set terminal S of a set-rest type flip-flop circuit 40 to set the same and its Q output ("1") is applied to one input of an AND gate circuit 41, thus enabling the same.

The outputs of the AND gate circuits 31 through 37 are applied to the other input of the AND gate circuit 41 via OR gate circuit 39 and after being delayed one bit time by a delay flip-flop circuit 42 are applied to the reset terminal R of the flip-flop circuit 40. Since the reference timing pulse P always appears before the note state digit signal Q1 through Q9 when outputs "1" are produced by the AND gate circuits 31 through 37 in response to the reference timing pulse P, the AND gate circuit 41 is enabled and its output "1" is applied to the strobe input S of the latch circuit 38. One bit later the flip-flop circuit 40 is reset. Thereafter, the AND gate circuit 41 would not be enabled even when the OR gate circuit 39 produces an output "1". Consequently, the strobe pulse S1-1 applied to the latch circuit 38 from the AND gate circuit 41 is produced only one with a width of one bit each time when a set of the note state digit signals is sent out, in other words each time when the logic level of the note state digit signal Q1 of the highest frequency is reversed.

The timing of producing the strobe pulse S1-1 is determined by the octave signal O1 through O7. For example, when the octave signal O7 is "1" the AND gate circuit 31 is enabled when the reference timing pulse P is applied to the fourth stage of the shift register 28 to produce the strobe pulse S1-1. At this time, the note state digit signals Q3, Q2 and Q1 are being applied to the first, second and third stages respectively of the shift register 28, with the result that these note state digit signals are latched by the latch circuit 38.

The latch circuit 38 has nine latch positions P1 through P9 of which P1 corresponds to the weight of the most significant bit while P9 to the weight of the least significant bit. Thus, the outputs from the first to 9the stages of the shift register 28 would be inputted to the latch positions P1 through P9 respectively of the latch circuit 38, and the outputs of respective latch positions of the latch circuit 38 are outputted from the address generator 11-1 as address signals of nine bits A1 through A9.

A strobe pulse S1-1 is produced each time when the timing pulse P and the note stage digit signals Q1 through Q9 appear on line 27 in the order mentioned to rewrite or update the content of the latch circuit 38. Each time when the logic level of the note stage digit signal of the highest frequency varies, the octave-multiplexed note signals P, Q1 through Q9 are produced, so that the values of the address signal bits A1 through A9 produced by the latch circuit 38 vary each time when the values of the note state digits Q1 through Q9 vary. In this manner, the note state digit signals Q1 through Q9 corresponding to the note name of the key assigned to the given channel are maintained in parallel, whereby there is obtained a binary address signal A1 through A9 whose bit positions have been shifted longitudinally according to the octave signals Q1 through O7 representing the octave range of the given key. The strobe pulse S1-1 produced by the AND gate circuit 41 is produced by the address generator 11-1 as a signal synchronous with the variation in the values of the address signal A1 through A9 assigned to the given channel CH1 and applied to a flip-flop circuit 46 and a latch circuit 12-1 to be described later. As above described, whenever the minimum unit Q1 of the variation of the note state data, which constitute the address signal, changes the AND gate circuit 41 produces a strobe pulse signal S1-1. One example of the manner of producing the strobe signal S1-1 is shown in FIG. 3(b), and one example of an address designated by the address signal bits A1 through A9 produced by the latch circuit 38 is shown in FIG. 3(c).

The higher order 6 bits A1 through A6 among the address signal bits A1 through A9 are applied to a group of AND gate circuits 43 of the multiplexer 15 which comprises for other channels, like the group of AND gate circuits 43 corresponding to the channel CH1, a group of AND gate circuits, not shown, applied with the address signal bits A1 through A6 of respective channels CH2 through CH7, corresponding to respective channels. The outputs A1 through A6 of the AND gate group of respective channels CH1 through CH7 are grouped by OR gate circuits 44 bit by bit and the grouped signals are applied to the address input of the waveform memory device common to all channels. The gate inputs of the AND gate group 43 corresponding to channel CH1 are supplied with a channel selection signal CH1S corresponding to channel CH1. AND gate circuit groups, not shown, corresponding to the other channels CH2 through CH7 in the multiplexer 15 are also supplied with channel selection signals CH2S to CH7S corresponding to these channels from the timing signal generator 22 shown in FIG. 1.

Figure 3:
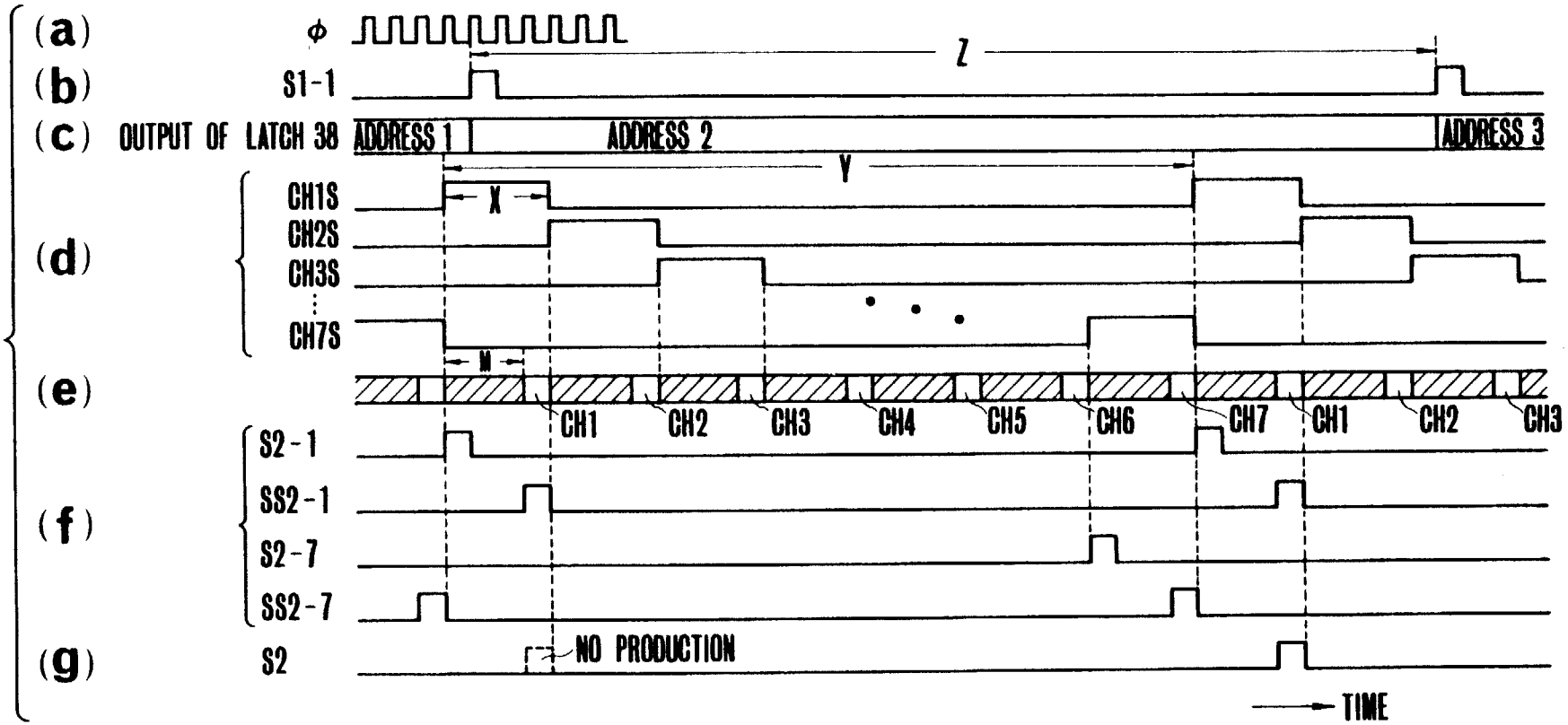
FIG. 3(a) through 3(g) are timing charts useful to explain the operation of the embodiment shown in FIGS. 1 and 2.

As shown in FIG. 3(d), the channel selection signals CH1S through CH7S corresponding to respective channels CH1 through CH7 have a definite pulse width X and a definite period Y and the channel select signals for respective channels are generated sequentially with a definite spacing. Consequently, the multiplexer 15 first addresses signals A1 through A6 of the channel CH1 according to the channel selection signal CH1S, then selects the address signals A1 through A6 of the next channel CH2. Therefore, the address signals A1 through A6 of the following channels CH3 through CH7 are sequentially selected according to the channel selection signals CH3S to CH7S, whereby the selection of the address signals A1 through A6 of the channels Ch1 through CH7 is repeated sequentially. In this manner, the address signals A1 through A6 of respective channels CH1 through CH7 are applied on the time division basis to the address input of the waveform memory device 17.

In order to stably read out the data from the ROM utilized as the waveform memory device 17, it is necessary to read out taking a certain minimum read time. Thus, the width X of the channel selection signal is determined by the time necessary for the stable read out. For instance, if an M bit time length is necessary for the stable read out, X is made to be equal to an $(M+1)$ bit time length. FIG. 3(e) shows output channels of the waveform memory device 17 (ROM) read out on the time division basis, in which shaded portions show the time (M bit time) necessary to read out stably. FIG. 3(c) shows the fact that a stable output can be read out during the last one bit time of the time division time slots of respective channels CH1 through CH7.

Each one channel of the demultiplexer 16 comprises a 6 bit latch circuit 45, a reset priority type flip-flop circuit 46 and an AND gate circuit 47. The waveform sampling point amplitude data of each channel, which are constituted by 6 bit digital data read out from the waveform memory device on the time division basis are respectively applied to the data input D of a latch circuit 45 corresponding to respective channels CH1 through CH7. The reset input R of the flip-flop circuit 46 of the channel CH1 is supplied with a signal S1-1 synchronous with the variation of the address signals A1 through A9. The reset inputs of similar flip-flop circuits, not shown, of the other channels CH2 through CH7 are supplied with signals S1-2 through S1-7 (FIG. 1) synchronous with the variation of the address signals A1 through A9 of these channels. The set input S of the flip-flop circuit 46 is supplied with the first control signal S2-1 for the channel CH-1, whereas the set inputs of similar flip-flop circuits, not shown, of the other channels CH2 through CH7 are respectively applied with the first control signals S2-2 through S2-7 corresponding to these channels. The output of the flip-flop circuit 46 is applied to one input of an AND gate circuit 47 while the other input thereof is connected to receive the second control signal SS2-1 corresponding to the channel CH1, and the AND gate circuits, not shown, of the other channels CH2 through CH7 are respectively supplied with the second control signals SS2-2 through SS2-7 corresponding to these channels. The output of the AND gate circuit 47 is applied to the strobe input S of the latch circuit 45.

The first control signals S2-1 through S2-7 corresponding to respective channels CH1 to CH7 are produced in synchronism with one bit time of the build-up portion of the channel selection signals CH1S through CH7S (see FIG. 3(d)) corresponding to respective channels, while the second control signals SS2-1 through SS2-7 are generated in synchronism with one bit time of the end portion of the pulses of the channel selection signals CH1S through CH7S. For reference, control signals S2-1, SS2-1, S2-7 and SS2-7 for the channels CH1 and CH7 are shown in FIG. 3(f).

Taking channel CH1 as an example, while the waveform sampling point amplitude data regarding the channel CH1 is being read out of the waveform memory device 17 in accordance with the channel selection signal CH1S, the first control signal S2-1 generated in synchronism with the build-up of the signal CH1S sets the flip-flop circuit 46 thus making its Q output to become "1". M bit time length thereafter (that is when the reading out of the ROM becomes stable) the second control signal SS2-1 is generated to apply a strobe pulse S2 to the latch circuit 45 via AND gate circuit 47. Consequently, when the waveform sampling point amplitude data regarding channel CH1 read out of the waveform memory circuit 17 becomes stable, a strobe pulse S2 would be applied to the same latch circuit 45 for the same channel CH1 thus latching the correct waveform sampling point amplitude data by the latch circuit 45. (i.e., distributed or demultiplexed and converted into a sustained signal). At this time the outputs read out from the waveform memory device are not distributed to (or latched by) the latch circuits, not shown, corresponding to the other channels CH2 through CH7. Concerning the other channels CH2 through CH7, similar to the channel CH1, the waveform sampling point amplitude data of these other channels read out on the time division basis from the waveform memory device 17 are latched (that is demultiplexed and converted into a sustained signal) by the latch circuits, not shown, similar to latch circuit 45 in accordance with the second control signals SS2-2 through SS2-7 corresponding to these channels.

As above described, the demultiplexer 16 distributes the waveform sampling point amplitude data analog respective channels Ch1 to CH7 in synchronism with the time division reading out timing of the waveform memory device 17 and convert the multiplexted data into parallel sustained signals.

The flip-flop circuit 46 and the AND gate circuit 47 operate to cause the latch circuit 45 to perform the latching operation only when the reading out of the data from the waveform memory device 17 has been stabilized. As shown in FIGS. 3(c) and 3(d), when a channel selection signal CH1S of a channel CH1 is generated when the address of that channel changes (in this example, from address 1 to address 2), just while the waveform sampling point amplitude data of an address (in this example, address 1) is being read out, the address would be switched to the next address 2 so that the read out output would not be stabilized even at a time at which the reading out would otherwise become stable (that is when the second control signal SS2-1 is generated). This is caused by the fact that the time division timing is not synchronous with the pitch of the musical tone, that is the time at which the waveform reading out address changes. Thus, it is not advantageous to latch by the latch circuit 45 such unstable read out output. For this reason, the circuit is constructed such that when signal S1-1 synchronous with the address change is generated during an interval between the setting of the flip-flop circuit 46 effected by the first control signal S2-1 and the generation of the second control signal SS2-1, the flip-flop circuit 46 would be reset so as to disenable the AND gate circuit 47 to prevent generation of the stable pulse S2 of the latch circuit 45. Since the flip-flop circuit 46 is of the reset priority type even when both control signals S1-1 and S2-1 are generated simultaneously, the flip-flop circuit 46 remains in the reset state so that no strobe pulse S2 would be generated.

As shown in FIG. 3(g), when the address of the given channel CH1 is switched when the channel selection signal CH1S is generated, the strobe pulse S2 is not produced. For this reason, a waveform sampling point data corresponding to a new address (in this example, address 2) would not immediately be latched by the latch circuit 45, but this data would be latched by the latch circuit by a strobe pulse S2 when the next channel selection signal CH1S is generated. For the purpose of positively latching the waveform sampling point amplitude data corresponding to an address which has been changed by the next strobe pulse S2 even when this pulse is not produced at the time of address change, it is essential to determine the period Y of the channel selection signals CH1S through CH7s as follows.

$$Y_{max.} = Z_{min} - X \ldots \quad (1)$$

where Ymax represents a maximum value that can be determined for period Y, while Zmin, represents a minimum value of an interval Z (see FIG. 3(c)) of one address and corresponds to a minimum change unit of the address signal A1 through A9 of the highest tone pitch that can be produced by the electronic musical instrument 10 shown in FIG. 1, and Y represents the pulse width of the channel selection signals Ch1S through CH7S. This pulse width is determined by taking into consideration the stable reading out time of the ROM as above described but it may be considered that the pulse width is much smaller than Zmin. The equation (1) means that it is necessary to determine the period Y to be smaller than the difference between the minimum address change interval Zmin. and the pulse width X.

The waveform sampling point amplitude data of the channels respectively latched by the latch circuit 45 in the distributor or demultiplexer 16 are applied to the data inputs D of the latch circuits 12-1 through 12-7 corresponding to respective channels CH-1 through CH-7. To the strobe inputs S of the latch circuits 12-1 through 12-7 are applied signals S1-1 through S1-7 synchronous with the address change and produced by the address generators 11-1 through 11-7 corresponding to respective channels. Although the waveform sampling point amplitude data of respective channels CH1 through CH7 have already been converted into sustained signals 16, since in this demultiplexer 16 the latching operation has been made in synchronism with the time divisioned reading out of the waveform data there is a fear that a time division clock component may remain. Accordingly, the latch circuits 12-1 through 12-7 are constructed in such a manner that the time division clock component is completely eliminated by relatching in synchronism with or in harmony with the pitch of the musical tone. Since signals S1-1 through S1-7 ultilized as the strobe signals of the latch circuits 12-1 through 12-7 for respective channels CH1 through CH7 are synchronous with the changes of address signals A1 through A9 for respective channels CH1 through CH7, these signals S1-1 through S1-7 have a frequency of $Z^n$ (n is a natural number) times of the tone pitches assigned to respective channels CH1 through CH7. In other words, these signals are in harmony with the produced tone.

The waveform sampling point amplitude data outputted by the latch circuit 12-1 are applied to the digital-analog converter 48 of the digital analog converter and interpolar circuit 13-1. The digital-analog converter 48 converts the 6-bit digital waveform sampling point amplitude data applied thereto into an analog signal A which is then applied to the interpolator 49. The digit-analog converter 48 stores an analog signal B of the immediately preceding sampling point amplitude data and applies this stored signal B to the interpolator 49. This interpolator 49 functions to interpolate a predetermined function, for example a trigonometric function, between two analog signals A and B which correspond to two adjacent sampling point amplitudes thereby interpolating over 8 steps according to the lower order 3 bits A7, A8 and A9 of the address signal. A circuit disclosed in U.S. Patent No. 4,036,096 may be used as the interpolator.

An analog musical tone waveform signal produced by the digital-analog converter and interpolator circuit 13-1 is applied to the voltage controlled type amplifier (VCA) 50 of the envelope imparting circuit 14-1. In response to a key-on signal supplied from the latch circuit 25 in the address generator 11-1 of the given channel CH1, an envelope generator 51 generates a predetermined envelope waveform signal. The degree of amplification of the VCA 50 is controlled by the envelope waveform signal so as to produce an analog musical tone waveform signal imparted with the envelope. If desired, the VCA 50 may be omitted in which case the analog envelope waveform signal generated by the envelope generator 51 is used as a reference voltage for the digital-analog converter 48. In this case, the digital-analog converter and interpolator circuit 13-1 produces an analog musical tone waveform signal imparted with the envelope.

Figure 4:
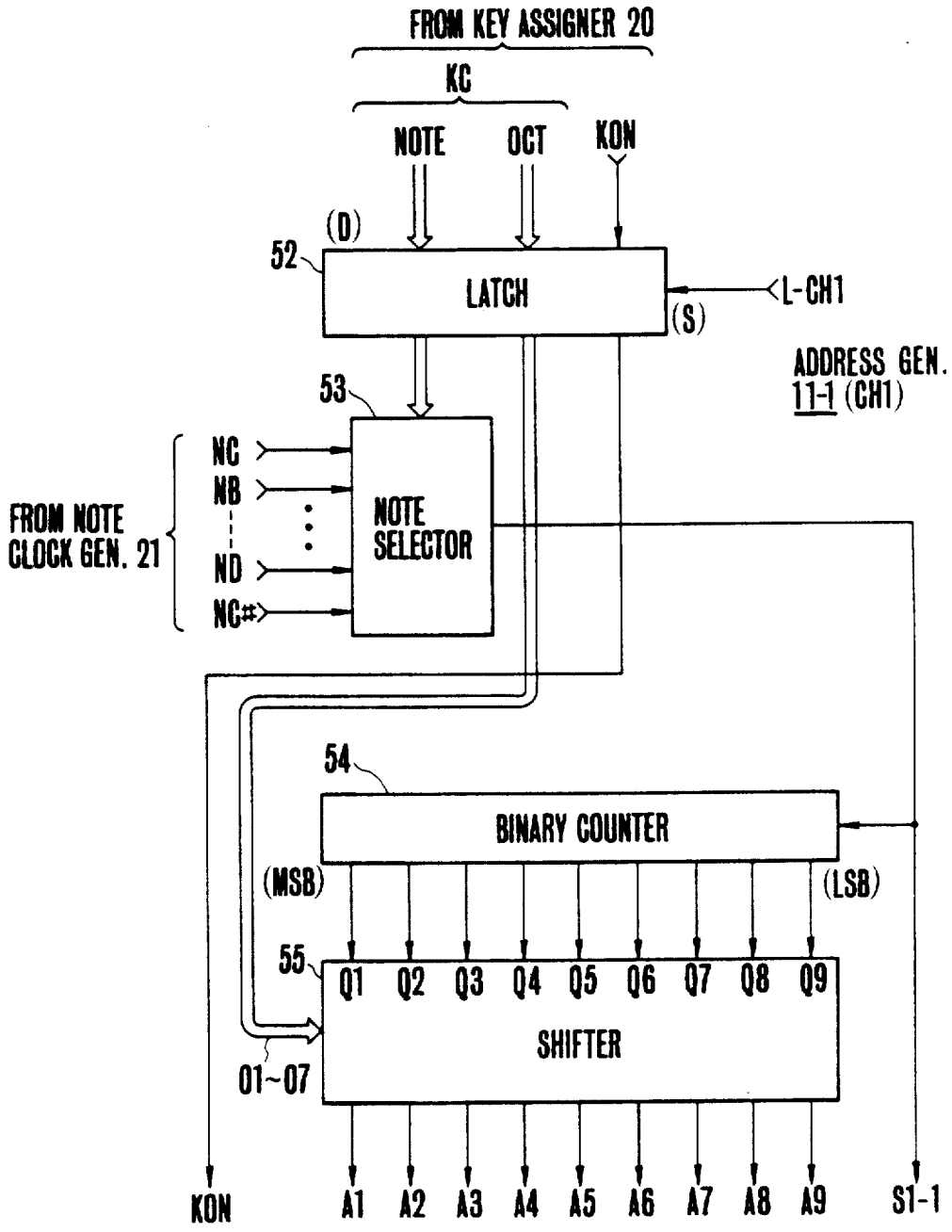
FIG. 4 is a block diagram showing another example of an address generator.

FIG. 4 shows the detail of a modified example 11-1 of the address generators 11-1 through 11-7. Although only the channel CH1 is shwon in detail, it should be understood that the other channels CH2 through CH7 have the same construction. Although in the embodiment shown in FIG. 2, the octave-multiplexed note signals were used as the note clock signals NC# through NC, in the modification shown in FIG. 4, the address generators 11-1 through 11-7 are constructed such that high frequency clock pulses corresponding to respective note names are used as the note clock signals NC# through NC instead of using the octave-multiplexed note signals. More particularly, where the address generators 11-1 through 11-7 are constructed as shown in FIG. 4, the note clock generator 21 (see FIG. 1) is constructed to generate note clock signals NC# through NC respectively constituted by separate clock pulses corresponding to the pitches of respective note names C# through C.

Figure 2:
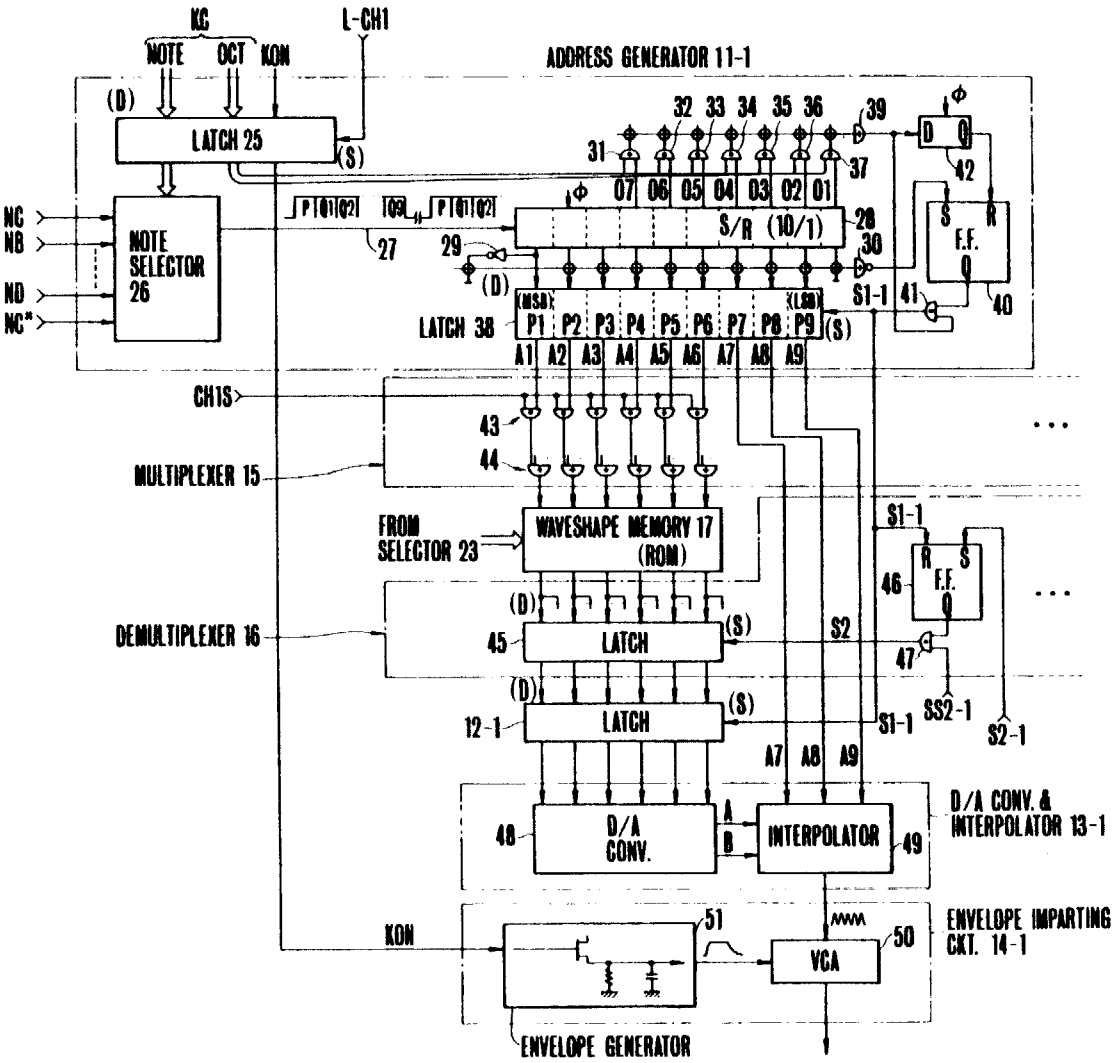
FIG. 2 is a block diagram showing the detail of one channel of the embodiment shown in FIG. 1.

The latch circuit 52 is identical to that shown in FIG. 2 and operates to latch a key code KC and a key-on signal KON assigned to the given channel CH1 and selected from key codes KC and key-on signals KON which are given on the time division basis from the key assigner 20. A note selector 53 selects a single note clock signal (one of NC# through NC) among a plurality of note clock signals NC# through NC in accordance with a note code NOTE. The note clock signal selected by the note selector 53 is applied to the count input of a 9-bit binary counter 54 and is also delivered out from the address generator 11-1 as a signal S1-1 synchronous with the address change.

A shifter 55 is provided for shifting to the left or right the bit position of the 9-bit binary code given by the counter 54 according to the content of an octave code OCT latched by the latch circuit 52, and the output of the shifter 55 (that is the output binary code of the counter 54 which has been shifter to the left or right) is delivered out from the address generator 11-1 as the address signals A1 through A9. Denoting the outputs of the counter 54 by Q1 through Q9 (in which Q1 is the MSB, and Q9 is the LSB), the states of shift corresponding to respective octave signals O1 through O7 contained in the octave code OCT are shown in the following Table I. As the octave range increases, the values of the address signals A1 through A9 become twice, 4 times, 8 times . . . as can be noted from Table I.

TABLE I

| | | Shift circuit 55 Address | | | | | | | | |
|---|---|---|---|---|---|---|---|---|---|---|
| Octave | | (MSB) A1 | A2 | A3 | A4 | A5 | A6 | A7 | A8 | (LSB) A9 |
| low | 01 | Q1 | Q2 | Q3 | Q4 | Q5 | Q6 | Q7 | Q8 | Q9 |
| ↓ | 02 | Q2 | Q3 | Q4 | Q5 | Q6 | Q7 | Q8 | Q9 | Q0 |
| ↓ | 03 | Q3 | Q4 | Q5 | Q6 | Q7 | Q8 | Q9 | 0 | 0 |
| ↓ | 04 | Q4 | Q5 | Q6 | Q7 | Q8 | Q9 | 0 | 0 | 0 |
| ↓ | 05 | Q5 | Q6 | Q7 | Q8 | Q9 | 0 | 0 | 0 | 0 |
| ↓ | 06 | Q6 | Q7 | Q8 | Q9 | 0 | 0 | 0 | 0 | 0 |
| high | 07 | Q7 | Q8 | Q9 | 0 | 0 | 0 | 0 | 0 | 0 |

Figure 5:
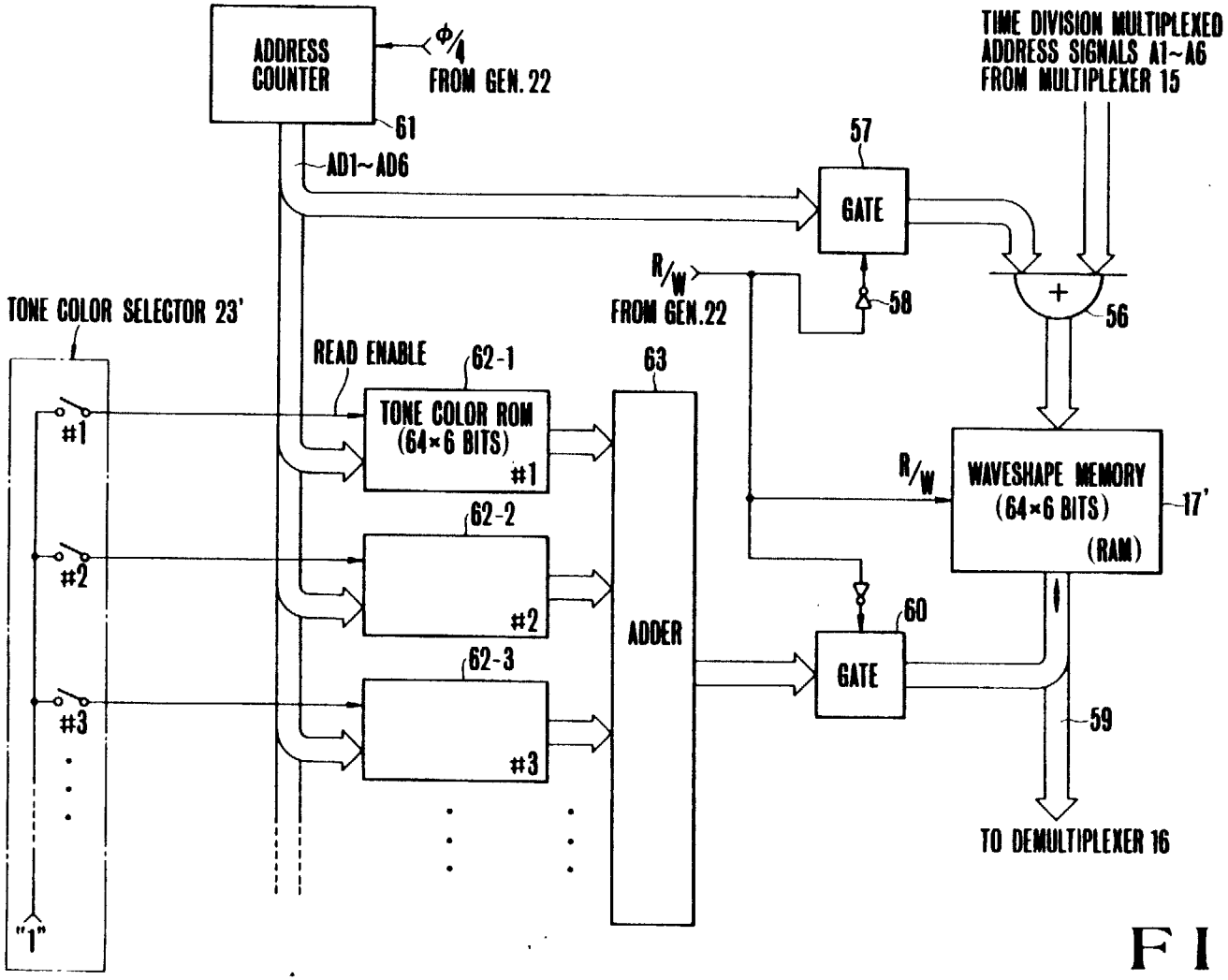
FIG. 5 is a block diagram showing a modification of this invention wherein a random access memory (RAM) is used as the waveform memory device shown in FIG. 1.
Figure 6:
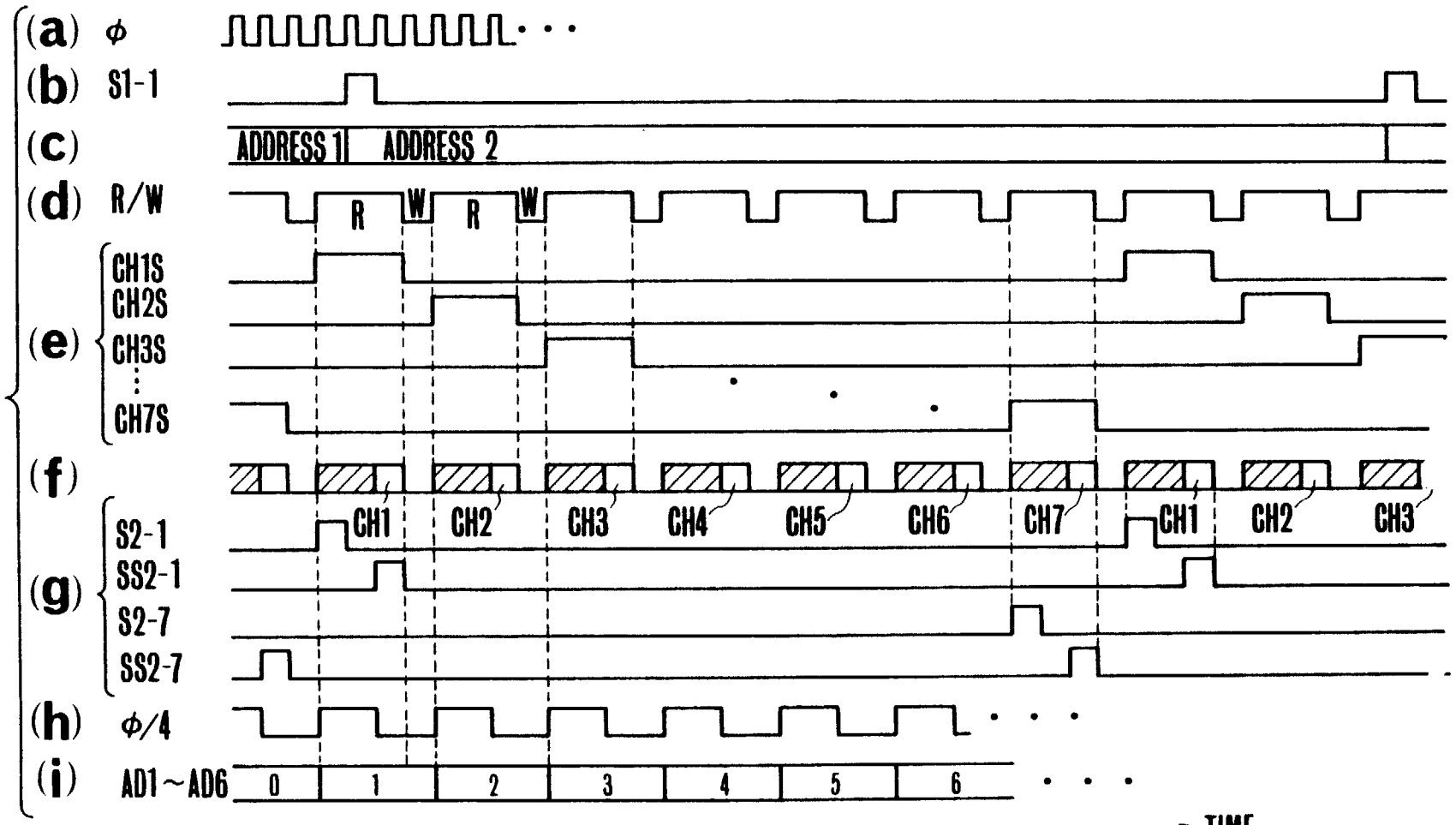
FIG. 6(a) through 6(i) are timing charts for explaining the operation of the modification shown in FIG. 5.

Although in the embodiment shown in FIG. 1, a ROM was used as the waveform memory device, it is also possible to use a random access memory device (RAM). FIG. 5 shows a modification in which a RAM is used as a waveform memory device 17' wherein the waveform memory device 17 and the tone color selector 23 of the electronic musical instrument 10 shown in FIG. 1 are substituted by a circuit shown in FIG. 5. Where the circuit shown in FIG. 5 is used, the multiplexer 15 and the demultiplexer 16 may be identical to those shown in FIG. 2, the timing of generation of the channel selection signals CH1S through CH7S, first and second control signals S2-1 through S2-7, and SS2-1 through SS2-7 is modified as shown in FIG. 6.

Where a RAM is used as the waveform memory device 17', it is necessary to use a signed R/W as a mode switching signal to suitably switch the operation mode of the RAM between a read out mode and a write mode. The mode switching signal R/W is generated by the timing signal generator 22 (FIG. 1), whereas the channel selection signals CH1S through CH7S, and control signal S2-1 and SS2-1 through SS2-7 are generated in synchronism with the mode switching signal R/W, as will be described hereunder with reference to FIGS. 6(a) through 6(i). FIGS. 6(a), 6(b) and 6(c) show the same signals as FIGS. 3(a), 3(b), and 3(c). The mode switching signal R/W is generated as shown in FIG. 6(d). When this signal R/W is "1", it shows the read out mode R, whereas when the signal R/W is "0", it shows the write mode W. The pulse width of the read out mode R is determined by the time necessary for stable reading out of the RAM which is generally shorter than that for the ROM. The hatched portions of FIG. 6(f) correspond to the times necessary for stable reading out of the RAM. In this example, each read time comprises two bit times. On the other hand, the pulse width of the write mode W is equal to one bit time.

FIG. 6(e) shows a manner of generating channel selection signals CH1S through CH7S. Thus, these signals are generated concurrently with the timing of the read out mode R. During the write mode W, none of the channel selection signals CH1S through CH7S is generated. As a consequence, during the write mode W, any one of the address signals A1 through A6 of any channel would not be selected by the selector or multiplexer 15 (FIG. 1). In the same manner as above described, the first control signals S2-1 through S2-7 are generated in synchronism with one bit time at the building up portion of each one of the channel selection signals CH1S through CH7S, whereas the second control signals SS2-1 through SS2-7 are generated in synchronism with one bit time immediately prior to the building down of each one of the channel selection signals CH1S through CH7S. FIG. 6(g) shows one example of generation of the control signals S2-1, SS2-1, S2-7 and SS2-7 for the channels CH1 and CH7. FIG. 6(f) shows the channels CH1 through CH7 of the waveform sampling point amplitude data read out from the waveform memory device 17' (FIG. 5) on the same division basis.

Address signals A1 through A6 for respective time divisioned multiplexed channels supplied by the multiplexer 15 are applied to the address input of the waveform memory device 17' via a group of OR gate circuits 56. To the other input of the OR gate group 56 is applied the output of the gate circuit 57. The mode switching signal R/W generated by the timing signal generating circuit shown in FIG. 1 is applied to the gate control input of a gate circuit 57 via an inverter 58. When the mode switching signal R/W is "1" (that is in the read out mode R) the gate circuit 57 is opened whereas when the signal R/W is "0" (that is in the writing mode) the gate circuit 57 is closed. For this reason, when one of the address signals A1 through A6 is received from the multiplexer 15, that is during the read out mode R, (see FIGS. 6(d) and 6(e)), the gate circuit 57 does not transmit a signal to the OR gate circuit group 56 with the result that only one of the address signals A1 through A6 from the multiplexer 15 would be applied to the waveform memory device 17' through the OR gate circuit group 56.

The mode switching signal R/W is applied to the operation mode control input of the waveform memory device 17' comprising a RAM. When this signal R/W is "1", the RAM becomes the read out mode R. Accordingly, the waveform sampling point amplitude data are read out from the waveform memory device 17' on the time division basis in accordance with the address signals A1 through A6 supplied from the multiplexer 15 during the read out mode R, and the read out data are then applied to the demultiplexer 16 (shown in FIGS. 1 and 2) via a data bus line 59. As shown by FIG. 6(g), since the control signals S2-1 through SS2-7 which are utilized in the demultiplexer 16 are generated with the timing of the read out mode R it is possible to correctly distribute, among respective channels CH1 through CH7, the waveform sampling data of respective channels read out on the data bus line 59 on the time division basis.

When the mode switching signal R/W is "0" that is during the write mode, the data on the data bus line 59 are written into the addresses of the waveform memory device (RAM) 17' designated by the address codes supplied to the address input. At this time since gate circuits 57 and 60 are both ON, the address codes passing through the gate circuit 57 are applied to the address inputs of the waveform memory device 17' via the OR gate circuit group 56, while the data passing through the gate circuit 60 are applied to the data bus line 59. At this time the multiplexer 15 does not supply the address signals A1 through A6 and control signals S2-1 through SS2-7 are not supplied to the distributor or demultiplexer 16. Accordingly, the data sent to the data bus line 59 from the gate circuit 60 are latched by the demultiplexer.

6-bit binary address codes AD1 through AD6 outputted from the address counter 61 are supplied to the gate circuit 57. The address counter 61 counts the number of the clock pulses $\phi/4$ which are produced as shown in FIG. 6(h) by dividing by 4 the clock pulse $\phi$ shown in FIG. 6(a). FIG. 6(i) shows one example of the address codes AD1 through AD6 which vary in accordance with the clock pulse $\phi/4$. As shown by FIGS. 6(d) and 6(i), the values of the address codes AD1 through AD6 vary in synchronism with the mode switching signal R/W.

Tone color ROMs 62-1, 62-2 and 62-3 are provided to memorize the musical tone waveform sampling point waveform data corresponding to various tone colors #1, #2, #3 . . . . For example, the tone color #1 of the ROM 62-1 corresponds to that of a flute and the tone color #2 of the ROM 62-2 corresponds to that of an oboe. A tone color selector 23' comprises a plurality of switches adapted to select respective tone colors #1, #2, #3 . . . , and only a tone color ROM (one of 62-1, 62-2, 62-3 . . . ) corresponding to a tone color selected by selector 23' can be read out. Address codes AD1 through AD6 are inputted from the address counter 61 to the address inputs of the tone color ROMs 62-1, 62-2, 62-3 . . . . The waveform sampling point amplitude data (6 bits) read out, according to the address codes AD1 to AD6, from one of the tone color ROMs which are rendered to become read out states by the tone selection signals from the tone color selector 23' are added together by an adder 63 and its output is applied to the gate circuit 60. As above described, the adder 63 produces a composite waveform sampling point amplitude data obtained by combining one or more selected tone colors.

Figure 7:
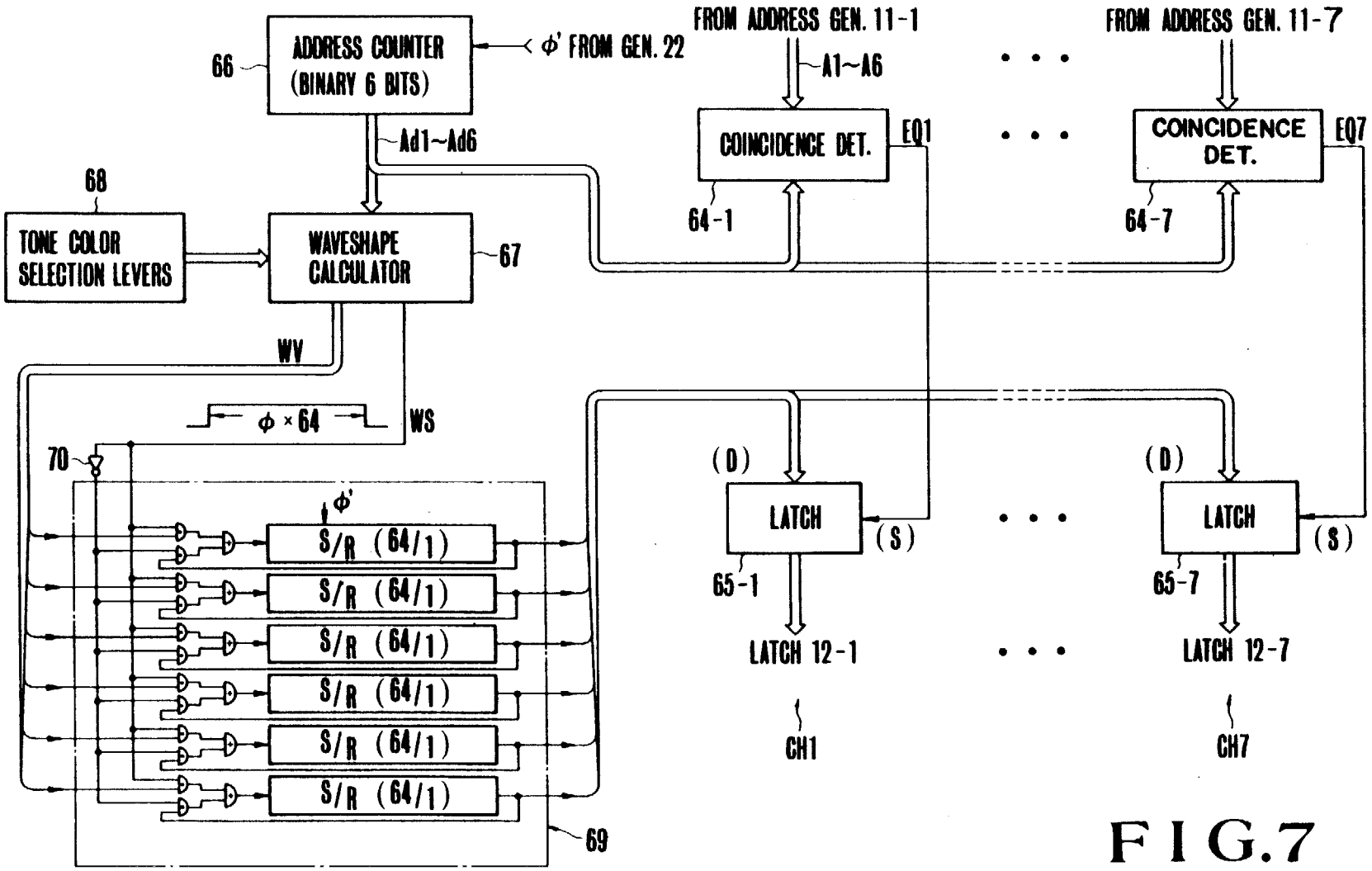
FIG. 7 is a block diagram showing a modification in which a shift register is used as the waveform memory device shown in FIG. 1.

The multiplexer 15, the waveform memory device 17, the demultiplexer, the timing signal generator 22 and the tone color selector 23 of the electronic musical instrument 10 shown in FIG. 1 may be substituted by a circuit shown in FIG. 7 in which coincidence detectors 64-1 through 64-7 and latch circuits 65-1 through 65-7 are provided to correspond to respective channels CH1 through CH7. To one input of the coincidence detectors 64-1 through 64-7 of respective channels CH1 through CH7 are applied the waveform read out address signals A1 through A6 from the address signal generators 11-1 through 11-7 (FIG. 1) of the same channels. The outputs of the latch circuits 65-1 through 65-7 corresponding to respective channels CH1 through CH7 are supplied to the latch circuit 12-1 through 12-7 (FIG. 1) of the same channels.

6-bit address codes AD1 through AD6 delivered out from the address counter 66 are supplied to the other inputs of the coincidence detectors 64-1 through 64-7. The address counter 66 comprises a 6-binary counter and counts a predetermined number of the clock pulses $\phi'$. The period of the clock pulse $\phi$ is determined to be shorter than 1/64 of the minimum variation interval of the waveform read out address signals A1 through A6, that is the interval of variation of the address signals A1 through A6 of the highest pitch. Accordingly, while the address signals A1 through A6 utilized to read out waveforms are being maintained at the same value, the 6 bit output codes AD1 through AD6 of the address counter 66 circulate at least once from the minimum value "000000" (decimal 0) to the maximum value "111111" (decimal 63). Coincidence detectors 64-1 through 64-7 respectively produce coincidence detection signals EQ1 through EQ7 when the address signals A1 through A6 given by the address generators sequentially coincide with address codes Ad1 through Ad6 in the order mentioned. These coincidence detection signals EQ1 through EQ7 are applied to the strobe inputs of the latch circuits 65-1 through 65-7.

A waveform calculator 67 calculates respective sampling point amplitude data of a desired musical tone waveform according to the input state of a tone color selection lever 68. The waveform calculator 67 has a construction similar to the data read out system from a sinusoid table disclosed in U.S. Pat. No. 4,085,644 issued to Ralph Deutsch on Apr. 25, 1978. Upon completion of the calculation, a write instruction signal WS is generated at a suitable time and while this signal WS is being produced, respective calculated sampling point amplitude data WV are produced in response to the address codes AD1 through AD6 generated by the address counter 61. The pulse width of the write instruction signal WS is equal to 1/64 of the count clock pulse $\phi'$ of the address counter 66. Accordingly, the values of the address codes Ad1 through AD6 circulate once during the generation of the write instruction signal WS thereby sequentially producing the sampling point amplitude data WV corresponding to all addresses.

The 6-bit waveform sampling point amplitude data produced by the waveform calculator 67 are supplied to the data inputs of a 64 stage, 6-bit circulating shift register 69. The write instruction signal WS is also applied to the write control input of the shift register 69, and a signal obtained by inverting the signal WS with an inverter 70 is applied to the self holding input of the shift register 69. The shifting operation of the shift register 69 is controlled by the same clock pulse $\phi'$ as that for the address counter 66. As a consequence the variation of the address codes AD1 through AD6 occurs synchronously with the drive of the shift register 69.

The sampling point amplitude data WV corresponding to the 64 addresses produced by the waveform calculator 67 are sequentially written into 64 stages of shift register 69 during the generation of the write instruction signal WS upon extinguishment of the signal WS, the shift register 69 becomes a self holding state so that the amplitude data delivered from the last stage would be fed back to the input stage thus circulating and holding the amplitude data. The waveform sampling point amplitude data produced from the last stage of the shift register 69 are supplied to the data inputs D of the latch circuits 65-1 through 65-7. The last stage of this shift register 69 produces waveform point data corresponding to 64 addresses respectively in synchronism with the address codes Ad1 through Ad6. Consequently when the coincidence detectors 64-1 through 64-7 produce coincidence detection signals EQ1 through EQ7, the waveform sampling point amplitude data corresponding to the addresses of the waveform read out address signals A1 through A6 are applied to the data inputs D of the latch circuits 65-1 through 65-7. Thus, the waveform sampling point data corresponding to the addresses of the address generators 11-1 through 11-7 respectively are latched by latch circuits 65-1 through 65-7 respectively.

The waveform calculator 67 and the shift register 69 shown in FIG. 7 can be substituted by a ROM similar to the waveform memory device 17 shown in FIG. 1.

Figure 8:
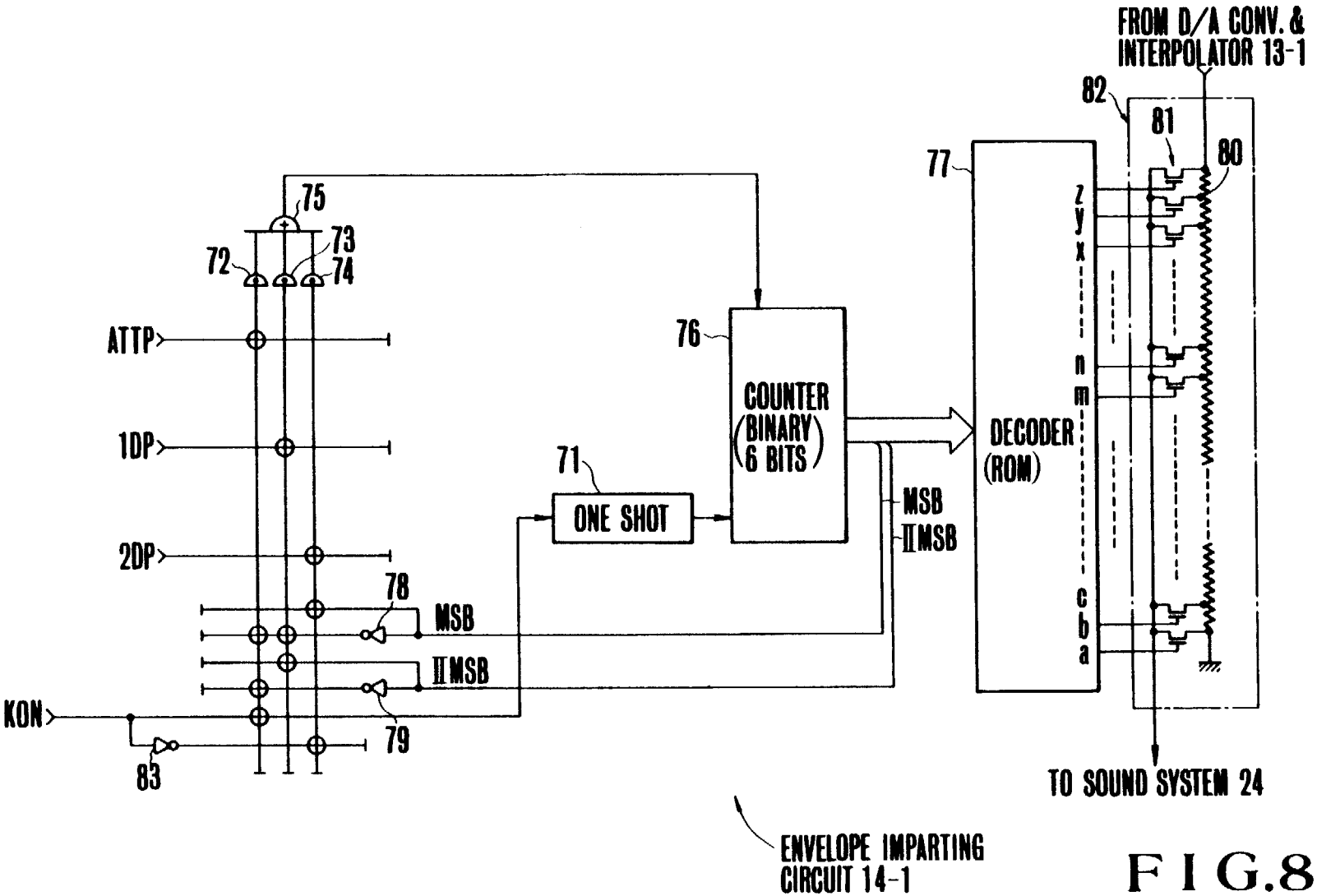
FIG. 8 is a connection diagram showing another example of an envelope imparting circuit.

An example in which VCA 50 and envelope generator 51 are used as the envelope imparting circuits 14-1 through 14-7 (FIG. 1) was shown in FIG. 2. However, a circuit as shown in FIG. 8 may be used as the envelope imparting circuits 14-1 through 14-7. Although in FIG. 8 shows the envelope imparting circuit 14-1 of only one channel CH1, it should be understood that those for the other channels CH2 to CH7 have the same construction.

More particularly, in FIG. 8, a key-on signal KON supplied from the address generator, 11-1 (FIG. 1) is applied to an one-shot circuit 71 and to one input of an AND gate circuit 72. When the key-on signal KON builds up to "1" at the start of depression of a key, the one shot circuit 71 generates a single short pulse which is used to clear the counter 76. This counter comprises a 6-bit binary counter with its outputs supplied to a decoder 77. The output from the most significant bit (MSB) of the counter 76 is applied to one input of an AND gate circuit 74 and its inverted signal obtained by an inverter 78 is applied to the inputs of AND gate circuits 72 and 73. The output from a bit next to the MSB of the counter 76 is applied to the input of the AND gate circuit 73 and to the input of the AND gate circuit 72 after being inverted by an inverter 79.

As the counter 76 is cleared at the time of building up of the key-on signal KON the outputs of the MSB and the bit succeeding thereto of the counter 76 become "00" thus enabling the AND gate circuit 72. An attack pulse ATTP is applied to the other input of the AND gate circuit 72 so that this attack pulse is selected by the AND gate circuit 72 and then supplied to the count input of the counter 76 via an OR gate circuit 75. Accordingly, at the start, the counter 76 counts the number of the attack pulses ATTP.

The output of the decoder 77 is applied to the gate control input of a FET gate group 81 of an attenuator 82 constituted by a resistor 80 and a FET gate group 81.

The attenuator 82 is supplied with the analog musical tone waveform signal supplied from the digital-analog converter and interpolator circuit 13-1 (see FIG. 1) to attenuate the amplitude level of the input analog musical tone waveform signal at a rate corresponding to the output of the decoder 77. The output of the decoder 82 is supplied to the sound system 24 shown in FIG. 1. The outputs of the decoder 77 vary from a to z. The rate of attenuation corresponding to the output a is the largest and that corresponding to the output z is the smallest. Where the rate of attenuation of the attenuator 82 is varied in accordance with the output of the counter 76, an envelope can be imparted to the musical tone signal. The decoder 77 decodes the outputs of counter 76 as shown in Table II.

TABLE II

| | Output of counter 76 | | | | | | decoder output |
|---|---|---|---|---|---|---|---|
| | MSB | | | | | LSB | of decoder 77 |
| Attack | 0 | 0 | 0 | 0 | 0 | 0 | a |
| | | | . | | | | . |
| | | | . | | | | . |
| (16 steps) | | | . | | | | . |
| | 0 | 0 | 1 | 1 | 1 | 1 | z |
| First decay | 0 | 1 | 0 | 0 | 0 | 0 | z |
| | | | . | | | | . |
| | | | . | | | | . |
| (16 steps) | | | . | | | | . |
| | 0 | 1 | 1 | 1 | 1 | 1 | n |
| Second decay | 1 | 0 | 0 | 0 | 0 | 0 | m |
| | | | . | | | | . |
| | | | . | | | | . |
| (32 steps) | | | . | | | | . |
| | 1 | 1 | 1 | 1 | 1 | 0 | |
| | | | . | | | | . |
| | | | . | | | | . |
| | | | . | | | | . |
| | 1 | 1 | 1 | 1 | 1 | 1 | a |

While the output of the counter varies over 16 steps of from "000000" to "001111" according to the counting of the number of the attack pulses ATTP, the attenuation rate of the attenuator 82 changes from the maximum (corresponding to the decoder output a) to the minimum (corresponding to the decoder output z) thereby establishing an attack condition of the envelope.

As the count of the counter 76 reaches "010000", the most significant bit and a next succeeding bit become "01" so that the AND gate circuit 73 is enabled. A first decay pulse 1DP is applied to the other input of the AND gate circuit 73 to be selected thereby and then applied to the counter 76 via OR gate circuit 75. While the output of the counter 75 varies from "010000" to "011111" by counting the number of the first decay pulse 1DP, the rate of attenuation of the attenuator 82 varies from the minimum value (corresponding to the decoder output z) to a suitable intermediate value (corresponding to the decoder output n) (see Table II). Thus, an attenuation characteristic can be obtained immediately after the attack.

When the output of the counter 76 reaches "100100", the AND gate circuit 73 is disabled to block the first decay pulse 1DP. Although the output of the MSB applied to the AND gate circuit 74 becomes "1" this AND gate circuit 74 would not be enabled while the key-on signal is being generated. Thus, the count is maintained at "100000", whereby a characteristic of the envelope can be obtained in which the amplitude level of the tone is constant.

Upon release of a depressed key, the output of the inverter 83 becomes "1" to enable the AND gate circuit 74, with the result that a second decay pulse 2DP is selected by this AND gate circuit and then applied to the counter 76 via OR gate circuit 75. In response to the second decay pulse 2DP, the count of the counter 76 varies over 32 steps i.e. from "100000" to "111111", and the rate of attenuation of the attenuator 82 changes from an intermediate value (corresponding to decoder output m) to a maximum value (corresponding to decoder output a) (see Table II). Thus, an attenuation characteristic can be obtained between the key release and the tone extinguishment. As the count of the counter 76 reaches "000000", the AND gate circuit 74 is disabled to block the second decay pulse 2DP.

Figure 9:
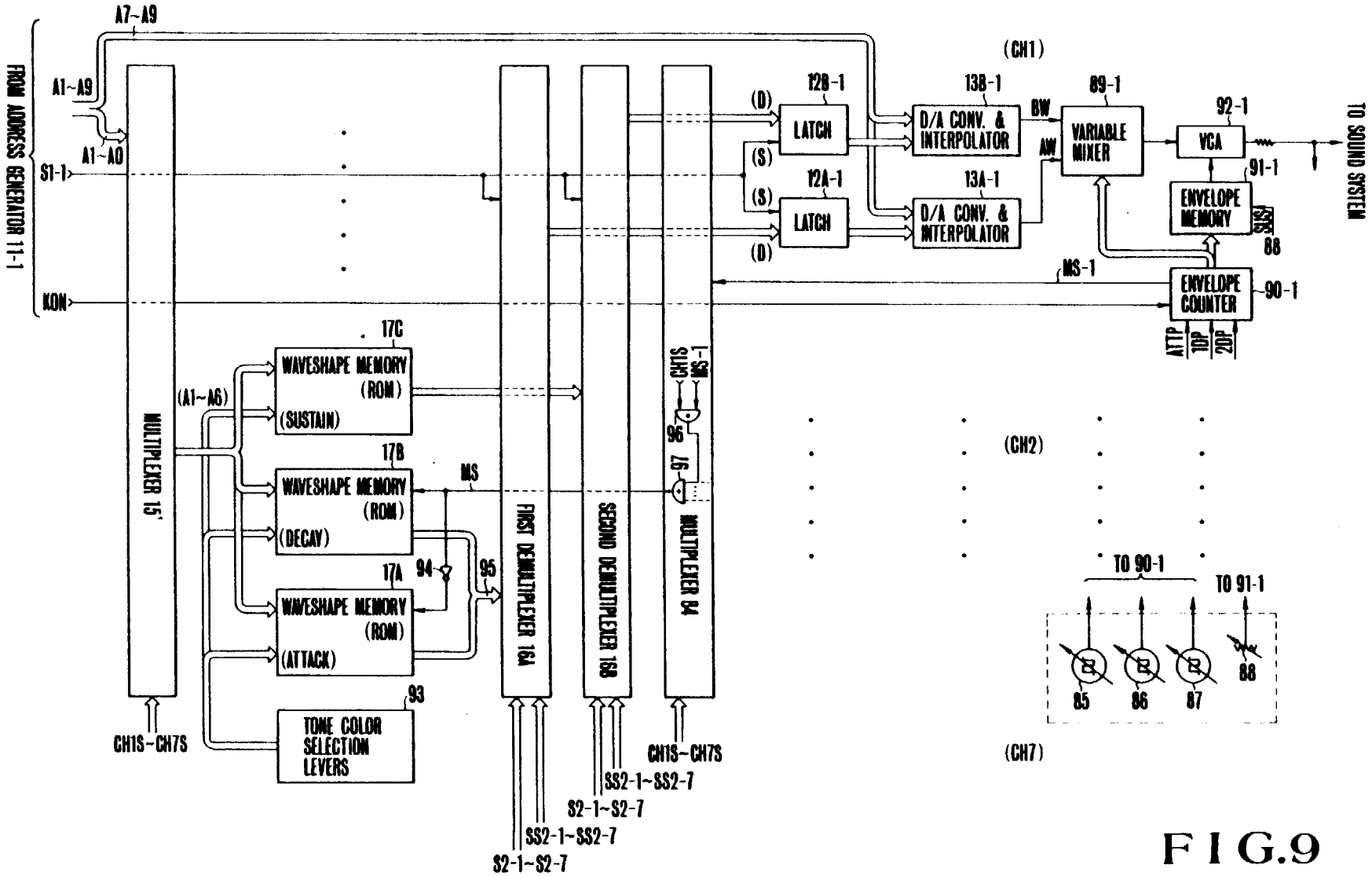
FIG. 9 is a block diagram showing another embodiment of this invention.

FIG. 9 shows a modification wherein two or more waveform data lines are used and by changing, on the time division basis, the ratio of admixing the waveform sampling point amplitude data read out from these data lines, a musical tone wave can be produced in which the waveform varies with time. In FIG. 9, circuit elements from the key switches 18 to the address generators 11-1 through 11-7 of respective channels CH1 to CH7 are omitted because these elements may be identical to those shown in FIG. 1. Multiplexer 15', waveform memory devices 17A, 17B and 17C, first and second demultiplexers 16A and 16B, multiplexer 84, attack pulse generator 85, first decay pulse generator 86, second decay pulse generator 87, sustain level setter 88, and tone color selection lever 93 are all common to respective channels. Latch circuit 12A-1 and 12B-1, digital analog converter and interpolator circuits 13A-1 and 13B-1, variable mixer 89-1, envelope counter 90-1, envelope memory device 91-1 and voltage controlled amplifier (VCA) 92-1 are used exclusively for the channel CH1, and similar circuit elements, not shown, are provided for other channels CH2 through CH7. Channel selection signals CH1S through CH7S applied to the multiplexers 15' and 84, and the control signals S2-1 through S2-7, and SS2-1 through SS2-7 applied to the first and second demultiplexers 16A and 16B are the same as those generated by the timing signal generator 22 and designated by the same reference numerals. These signals are generated in a manner as shown in FIGS. 3d and 3f.

Address signals A1 through A6 are supplied to the multiplexer 15' from the address generators 11-1 through 11-7 of respective channels CH1 through CH7. This multiplexer has the same construction as the multiplexer 15 shown in FIG. 2 and operates to multiplex, on the time division basis, the address signals A1 through A6 of respective channels according to channel selection signals CH1S through CH7S. The time division multiplexed address signals A1 through A6 are applied to the address inputs of the waveform memory devices 17A, 17B and 17C each comprising a ROM for storing musical tone waveforms having different shapes. The waveform memory device 17A stores a musical tone waveform that characterizes the tone color at the time of attack, the waveform memory device 17B stores the musical tone waveform that characterizes the tone color at the time of decay and the waveform memory device 17c stores the musical tone waveform that characterizes the tone color under stead state (sustain). Further, these waveform memory devices respectively store a plurality of difference musical one waveforms corresponding to a plurality of types of the tone color selectable by a tone color selection lever 93.

In response to address signals A1 through A6, musical tone waveforms corresponding to the type of the tone color selected by the tone color selection lever 93 are simultaneously read out from respective memory devices 17A through 17C, provided that the waveform memory device 17A for the attack and the waveform memory device 17B for the decay are arranged not to be read out simultaneously. More particularly, a memory selection signal MS produced by the multiplexer 84 is applied to the operation control input of one waveform memory device 17B, whereas a signal obtained by inverting the signal MS with an inverter 94 is applied to the operation control input of the other waveform memory device 17A.

When the memory selection signal MS is "1", the decay waveform memory device 17B is in a readable state, while the attack waveform memory device 17A is in a nonreadable state. On the other hand, when the memory selection signal MS is "0", the attack waveform memory device 17A is in a readable state, while the decay waveform memory device 17B is in a nonreadable state. Consequently, waveform amplitude point sampling data would not be simultaneously read out from both waveform memory devices 17A and 17B, thus ensuring reading out of only one of them.

Six-bix waveform sampling point data read out from the attack waveform memory device 17A or the decay waveform memory device 17B are applied to a common data bus line 95 and then to the first demultiplexer 16A. The waveform sampling point amplitude data are constantly read out of the sustain waveform memory device 17C according to the address signals A1 through A6 and then applied to the second demultiplexer 16B.

The first and second demultiplexers 16A and 16B have the same construction as the demultiplexer 16 shown in FIGS. 1 and 2, and each comprises a latch circuit 45, a flip-flop circuit 46 and an AND gate circuit 47 for each one of the channels CH1 through CH7. The flip-flop circuit 46 and the AND gate circuit belonging to the same channel may be used in common by the first and second demultiplexers 16A and 16B. The first demultiplexer 16A distributes among respective channels the waveform sampling point amplitude data of respective channels CH1 through CH7 which are read out from the waveform memory device 17A or 17B on the time division basis for converting them into sustained signals. The sampling point amplitude data of the attack or decay musical tone waveform regarding the channel CH1 is applied to the data input D of the latch circuit 12A-1 from the first demultiplexer. The second demultiplexer 16B operates to distribute among respective channels the sampling point amplitude data of respective channels read out from the waveform memory device 17C on the time division basis, and then converts the distributed data into sustained signals. The sampling point amplitude data of the sustain musical tone waveform regarding the channel CH1 are supplied to the data input D of the latch circuit 12B-1 from the second demultiplexer 16B.

The latch circuits 12A-1 and 12B-1 operate in the same manner as the latch circuit 12-1 shown in FIG. 2 and their operations are controlled by a signal S1-1 synchronous with the variation of the address signals A1 through A9. The sampling point amplitude data of the attack or decay musical tone waveform latched by the latch circuit 12A-1 is applied to the digital-analog converter and interpolator circuit 13A-1 to be converted into an analog signal. The sampling point amplitude data of the sustain musical tone waveform latched by the latch circuit 12B-1 is applied to the digital-analog converter and interpolator circuit 13B-1 to be converted into an analog signal. The digital-analog converter and interpolator circuit 13A-1 and 13B-1 have the same construction as the digital-analog converter and interpolator circuit 13-1 shown in FIGS. 1 and 2, thus interpolating the amplitude between two adjoining sampling points according to bits A7 to A9 of the address signals A1 through A9.

The analog signal AW for the attack or decay musical tone waveform and the analog signal BW for the sustain musical tone waveform which are produced from the digital analog converter and interpolator circuits 13A-1 and 13B-1 are applied to a variable mixer 89-1 which admixes the two analog musical signals AW and BW while varying the ratio of mixing according to the data given by an envelope counter 90-1 to supply a mixed musical tone signal to the VCA 92-1. As the ratio of mixing varies, the waveform of the resulting mixed musical tone signal also varies so that it is possible to produce a musical tone signal whose waveform or tone color varies with time by varying with time the ratio of admixture in accordance with the output of the envelope counter 90-1.

The musical tone signal applied to the VCA 92-1 is imparted with an amplitude envelope in accordance with an envelope waveform signal given by an envelope memory device 91-1. The output of the VCA 92-1 is admixed with the outputs of the other channels CH2 through CH7 and then supplied to the sound system, not shown.

Figure 12:
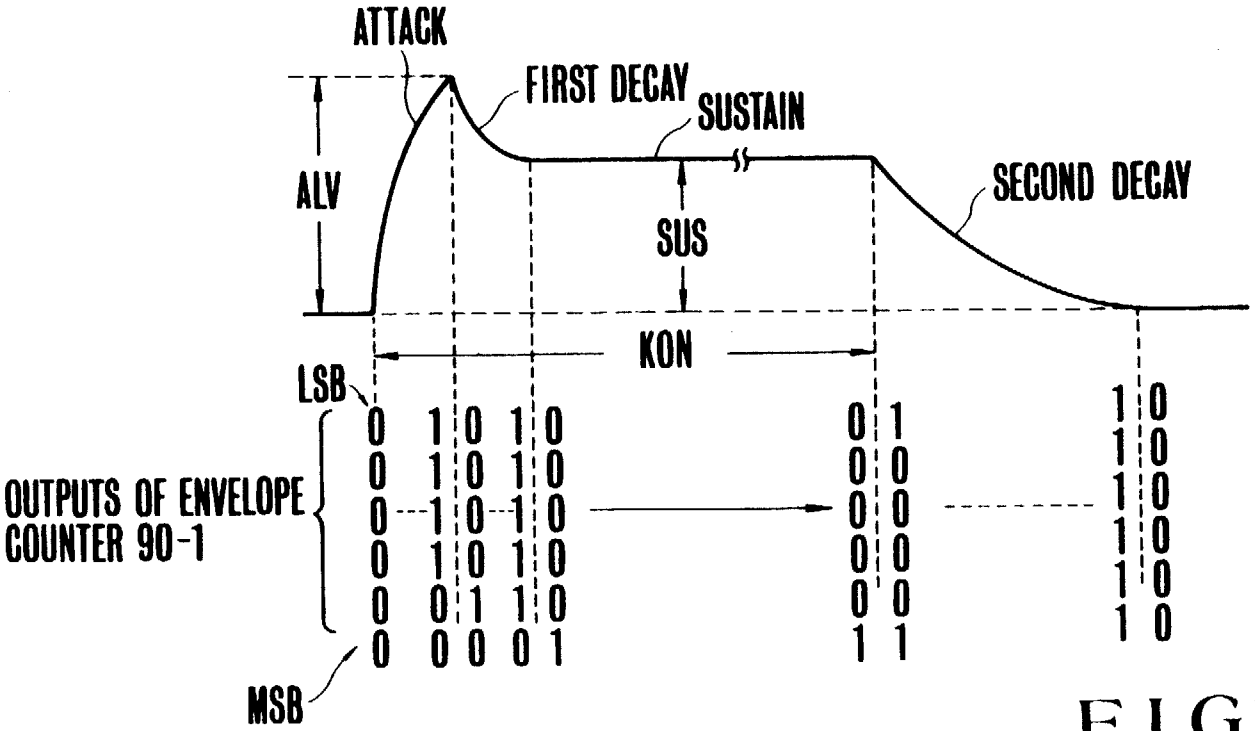
FIG. 12 shows a typical example of an envelope waveform and the output of the envelope counter.

An envelope waveform as shown in FIG. 12 is read out of the envelope memory device 91-1 in accordance with the output data of the envelope counter 90-1. The envelope waveform comprises four parts: an attack, a first decay, a sustain and a second decay. The envelope counter 90-1 develops a memory selection signal regarding the given channel CH1. The memory selection signal MS-1 is "0" while the envelope of the attack parts is being read out whereas "1" in other cases.

In other channels CH2 through CH7, not shown, memory selection signals MS-2 through MS-7 are also generated in accordance with the envelope states of respective channels. The memory selection signals MS-1 through MS-7 for respective channels are applied to a multiplexer 81 where they are multiplexed on the time division basis according to the channel selection signals CH1S through CH7S. As illustrated in the block of the multiplexer 84, the memory selection signal MS-1 of the channel CH1 is selected by an ANd gate circuit 96 at the same time as the channel selection signal CH1S for the same channel CH1 for application to an OR gate circuit 97 is supplied to the waveform memory device 17B and the inverter 94 as the time division multiplexed signal MS. The time at which the waveform memory device 17A or 17B is addressed on the time division basis by the address signals A1 through A6 of respective channels CH1 through CH7 coincides with timing of time division of the memory selection signal (i.e. channels coincide each other). Accordingly, which one of the attack waveform memory device 17A and the decay waveform memory device 17B should be used can be determined, on the time division basis, by the time division multiplexed memory selection signals MS for respective channels.

Figure 10:
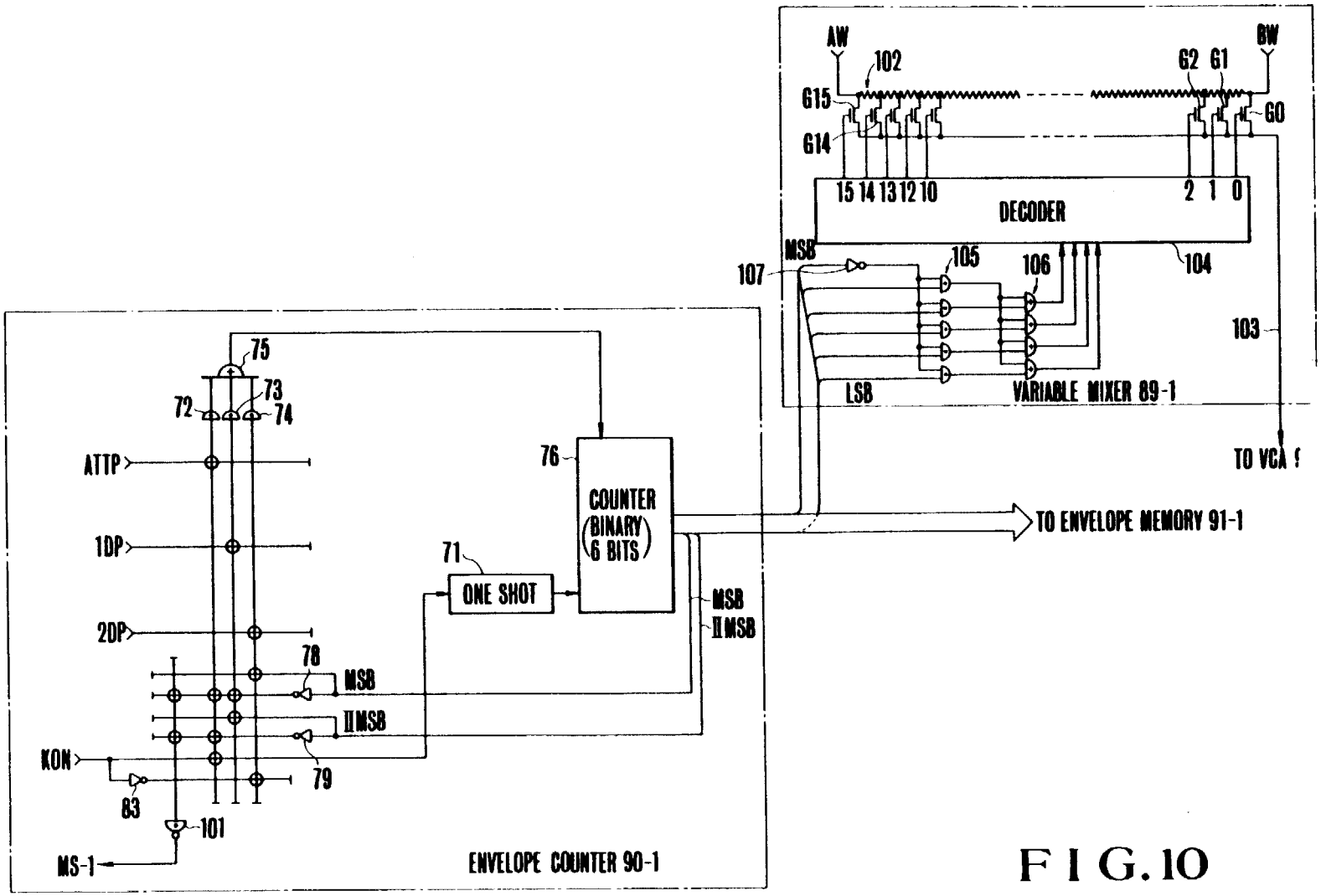
FIG. 10 is a block diagram showing one example of the variable mixing circuit and an envelope counter shown in FIG. 9.

One example of the variable mixer 89-1 and the envelope counter 90-1 is illustrated in FIG. 10. A one shot circuit 71, AND gate circuits 72, 73 and 74, an OR gate circuit 75, a counter 76 and inverters 78, 79 and 83 in the envelope counter 90-1 have the same construction as those shown in the envelope imparting circuit 14-1 and are designated by the same reference characters. More particularly, the 16 steps of from "000000" to "001111" of the 6-bit binary counter 76 are incremented by the attack pulse ATTP generated by the attack pulse generator 85, whereas the 16 steps of from "010000" to "011111" are incremented by the first decay pulse generated by the first decay pulse generator 96. When the count reaches "100000" the counter stops its counting operation and holds this value. After release of a depressed key the 32 steps of from "100000" to "111111" are incremented by the second decay pulse 2DP generated by the second decay pulse generator 87.

Figure 11:
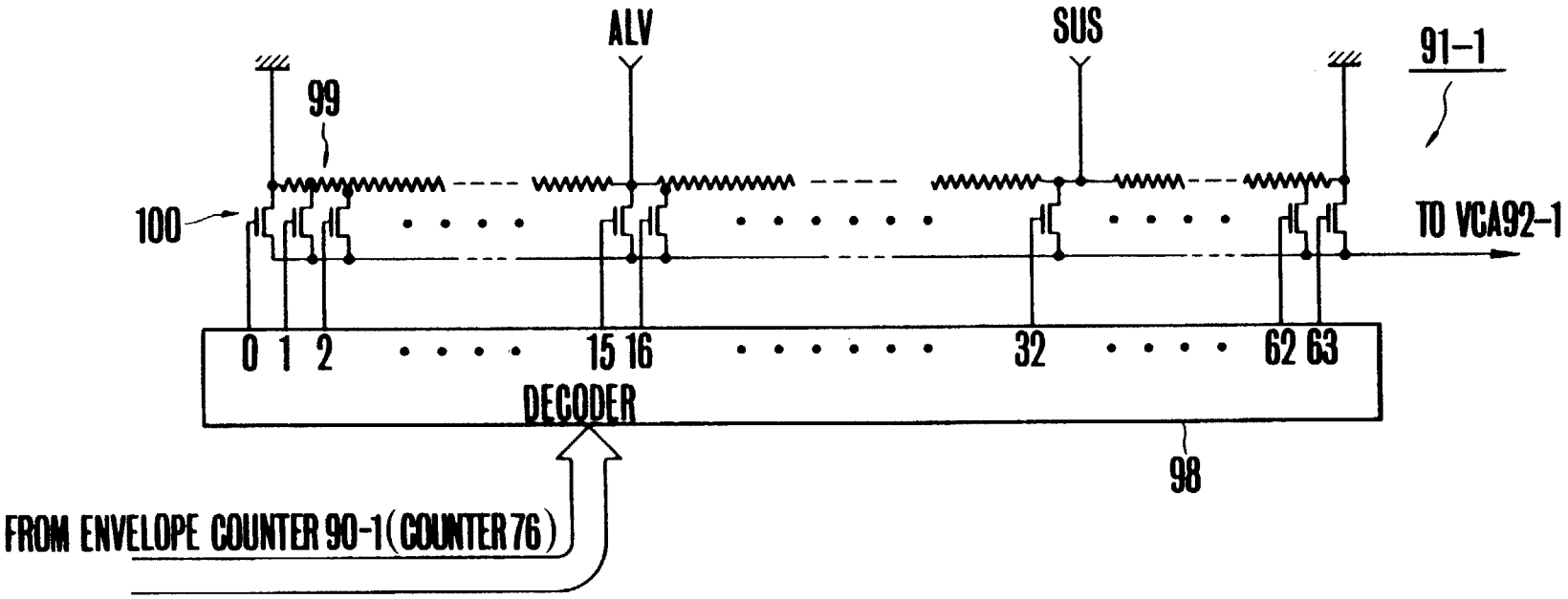
FIG. 11 is a connection diagram showing one example of the envelope memory device shown in FIG. 9.

The output of the counter 76 is applied to a decoder 98 of an envelope memory device 91-1, the detail thereof being shown in FIG. 11. As shown in FIG. 12, in the envelope memory device 91-1, during an interval in which the output of the envelope counter 90-1 (binary counter 76) charges from "000000" to "001111" the waveform of the attack part is read out. During an interval in which the output varies from "010000" to "011111" the waveform of the first decay part is read out whereas while "100000" is being held the sustain level is continuously read out. On the other hand, during an interval in which the output varies from "100000" to "111111" the waveform of the second decay part is read out. Thus, the decoder 98 of the envelope memory device 91-1 decodes the 6-bit binary counter output into decimal numbers of 0 to 63. In response to the decoded output, an analog envelope waveform is read out from an analog envelope memory device constituted by a resistance voltage divider 99 and a gate portion 100, thus producing a waveform (the waveform of the attack part) which builds up from the ground level to a predetermined attack level ALV while the counter output varies from "000000" (decimal 0) to "001111" (decimal 15). While the counter output varies from "010000" (decimal 16) to "011111" (decimal 31) a waveform (the waveform of the first decay part) is produced which builds down from the attack level ALV to the sustain level SUS. The voltage of the sustain level SUS is given by a sustain level setter 88 (FIG. 9). When the count of the counter 76 is held at "100000" the sustain level SUS is continuously read out by the output of the decoder 98 corresponding to decimal 32. After key release, when the count of the counter 76 varies from "100000" (decimal 32) to "111111" decimal 63 a waveform (the second decay waveform) is read out which builds down from the sustain level SUS to the ground level.

Signals produced by inverting the highest two bits of the counter 76 by inverters 78 and 79 are applied to a NAND gate circuit 101 of the envelope counter 90-1 shown in FIG. 10. Accordingly, where the highest two bits are "00", that is when the waveform of the attack part is being read out from the envelope memory device 91-1 the output of the NAND gate circuit 101 would become "0" whereas it becomes "1" in the other cases (the first decay, sustain and the second decay). The output of this NAND gate circuit 101 is applied to the multiplexer 84 (FIG. 9) to act as the memory selection signal. Consequently, at the time of attack, the waveform amplitude data is read out of the attack waveform memory device 17A, whereas an attack musical tone waveform signal acting as the analog musical tone signal AW is read out from the digital-analog converter and interpolator circuit 13A-1. At the time of the first decay, sustain or the second decay, the waveform amplitude data are read out from the decay waveform memory device 17B, while the decay musical tone waveform signal acting as the analog musical tone signal AW is read out from the digital-analog converter and interpolator circuit 13A-1. The digital-analog converter and interpolator circuit 13-B constantly produces a sustain musical tone waveform read out of the waveform memory device 17C and acting as the analog musical tone signal BW.

In the variable mixer 89-1 shown in FIG. 10, the analog musical tone signals AW and BW read out from the digital-analog converter and interpolator circuits 13A-1 and 13B-1 are applied to the opposite ends of a mixing resistor 102 which is divided into 15 sections and 16 FET gate circuit G0 through G15 are respectively connected to the opposite ends and intermediate points of the resistor 102. The outputs of respective gate circuits G0 through G15 are applied to a VCA 92-1 via a mixing output line 103.

To the gate inputs of respective gate circuits are separately applied the outputs 0 through 15 of the decoder 104. The ratio of admixing signals AW and BW can be varied by switching the gate circuits G0 through G15 which are to be enabled by the output of the decoder 104.

A 6-bit data word outputted from the envelope counter 90-1 (binary counter 76) is applied to the input of the decoder 104 via an AND gate circuit group 105 and an EXCLUSIVE-OR gate circuit group 106. The AND gate circuit group 105 comprises five AND gate circuits and one input of each of the respective AND gate circuits is connected to respectively receive the lower order 5 bits of the output of the envelope wave counter 90-1 (binary counter 76) while the other input is connected to commonly receive a data bit obtained by inverting with an inverter 107 the MSB of the envelope counter 90-1. The EXCLUSIVE-OR gate circuit group 106 comprises 4 EXCLUSIVE-OR gate circuits and one input of each of the respective OR gate circuits is connected to respectively receive the data of the 4 lower order bits of the output of the AND gate circuit 105, while the other inputs are connected to commonly receive the data of the MSB of the output of the AND gate circuit group 105. The decoder 104 operates to decode the 4-bit data outputted from the exclusive OR gate circuit group 106 into either one of 0 through 15 according to the decimal value of the 4-bit data.

The output "0" of the decoder 104 enables a gate circuit G0 connected to the input of the signal BW. In this case, only the musical signal BW is supplied to a line 103. Thus, the ratio of admixing of the other musical tone signal AW is zero. As the output of the decoder 104 increases in the order of (1), (2), (3), (4), (5) . . . . the ratio of admixing of the musical tone signal AW increases gradually. Where the output of the decoder 104 is (7) or (8) (more particularly at the intermediate point thereof) the ratio of admixture of the musical signals AW and BW becomes 1:1. As the output of the decoder 104 increases as (8), (9), (10) . . . , the ratio of signal AW becomes larger than BW, so that when the gate circuit G15 is enabled by the output (15) of the decoder 104, the ratio of the signal BW becomes zero and only the signal AW appears on the line 103.

The relationship between the state of the envelope counter 90-1 and the control of the mixing ratio of the variable mixer 89-1 is shown in the following Table III.

TABLE III

| State of envelope | Output of envelope gate circuit (MSB) (LSB) | Output of exclusive OR of group | Output the musical tone decoder | Variation in waveform | |
|---|---|---|---|---|---|
| Attack | 000000 | 0000 | 0 | Steady | (BW) |
| | 000001 | 0001 | 1 | ↓ | |
| | 000010 | 0010 | 2 | ↓ | (Variation) |
| | . | . | . | ↓ | |
| | . | . | . | ↓ | |
| | 001110 | 1110 | 14 | ↓ | |
| | 001111 | 1111 | 15 | Attack | (AW) |
| First decay | 010000 | 1111 | 15 | Decay | (AW) |
| | 010001 | 1110 | 14 | ↓ | |
| | . | . | . | ↓ | (Variation) |
| | . | . | . | ↓ | |
| | 011110 | 0001 | 1 | ↓ | |
| | 011111 | 0000 | 0 | Steady | |
| Sustain | 100000 | 0000 | 0 | Steady | (BW) |
| | . | . | . | ↓ | |
| | . | . | . | ↓ | |
| | 100000 | . | . | ↓ | |
| | | | | ↓ | (No Variation) |
| Second decay | 100001 | . | . | ↓ | |
| | . | . | . | ↓ | |
| | . | . | . | ↓ | |
| | 111111 | 0000 | 0 | Steady | (BW) |

At first let us consider a case in which the output of the envelope counter 90-1 varies from "000000" to "001111" that is where the attack part (see FIG. 12) of the envelope waveform is read out from the envelope memory device 91-1. In this case, the MSB of the output of the envelope counter 90-1 is "0" so that the data of the lower order 5 bits pass through the AND gate circuit group 105 as they are. At this time since the value of the fifth bit is always "0", the exclusive OR gate circuit group 106 produces the output data of the lower order 4 bits of the envelope counter 90-1 without any change (see Table III). As a consequence, as the envelope waveform of the attack part builds up, the output of the decoder 104 sequentially varies from (0) to (15). Accordingly, the mixed musical tone signal on the output line 103 first comprises only the musical tone signal BW, and thereafter with gradual increase of the level of the musical tone signal AW, the level of the musical tone signal BW decreases gradually. Finally the output contains only the musical tone signal AW when the peak level ALV of the attack has been read out.

As above described at the time of attack, an attack musical tone waveform signal is produced which is read out from the waveform memory device 17A (FIG. 9) as the musical tone signal. Thus, the mixed musical tone signal appearing on the output line 103 of the variable mixer 89-1 at the time of attack is the musical tone waveform (tone color signal BW) for the steady tone color read out from the waveform memory device 17C (FIG. 9). Thereafter, the waveform varies gradually while changing the ratio of admixing of the steady state tone color and attack musical tone waveforms. Finally, the output contains only the attack musical tone waveform (at the peak of attack).

Let us now consider a case, with reference to Table III, wherein the output of the envelope counter 90-1 changes from "010000" to "011111", that is when the first decay part (see FIG. 12) of the envelope waveform is being read out from the envelope memory device 91-1. Since the MSB output of the envelope counter 90-1 is "0", the AND gate circuit group 105 (see FIG. 10) produces the lower order 5 bit outputs of the counter 90-1 without any modifications at this time since the value of the fifth bit is always "1", the data of the lower order 4 bits of the output of the envelope counter 90-1 are respectively inverted by the EXCLUSIVE-OR gate circuit group 106. As a consequence, as the envelope waveform at the first decay part builds down the output of the decoder 104 sequentially decreases from (15) to (0) with the result that the mixed musical tone signal on the output line 103 first contains only the musical tone signal AW and thereafter with the gradual increase in the level of the musical tone signal BW, the level of the signal AW gradually decreases until at least the musical tone signal BW alone remains. As above described, during the first decay as the musical tone signal AW is given only the decay musical tone waveform signal read out of the waveform memory device 17B (FIG. 9). Consequently, during the first decay time, the waveform of the musical tone signal appearing on the output line 103 gradually changes from the musical tone waveform for the decay to that for the steady tone.

When the MSB of the envelope counter 90-1 becomes "1", i.e., in the case of the sustain and the second decay (see FIG. 12) the output of inverter 107 becomes "0" so that the AND gate circuit group 105 is disenabled. As a result, the signals given from the AND gate circuit group 105 to the EXCLUSIVE-OR gate circuit group 106 are all "0" and the outputs of the EXCLUSIVE-OR gate circuit group 106 are also all "0". Thus, the output of the decoder 104 is fixed to (0) and only the musical tone signal BW is applied to line 103. As above described, during the sustain and the second decay, the musical tone signal on the line 103 is fixed to the steady state musical tone waveforms, so that the tone color would not change.

Instead of using ROM's as the waveform memory devices 17A and 17B as shown in FIG. 9, RAM's shown in FIG. 5 or 7 or shift registers can also be used. The mixing ratio switching signal for the variable mixer 89-1 is not limited to such signal which varies with time as the output of the envelope counter, it is also possible to use the output of the tone color switch.

Figure 13:
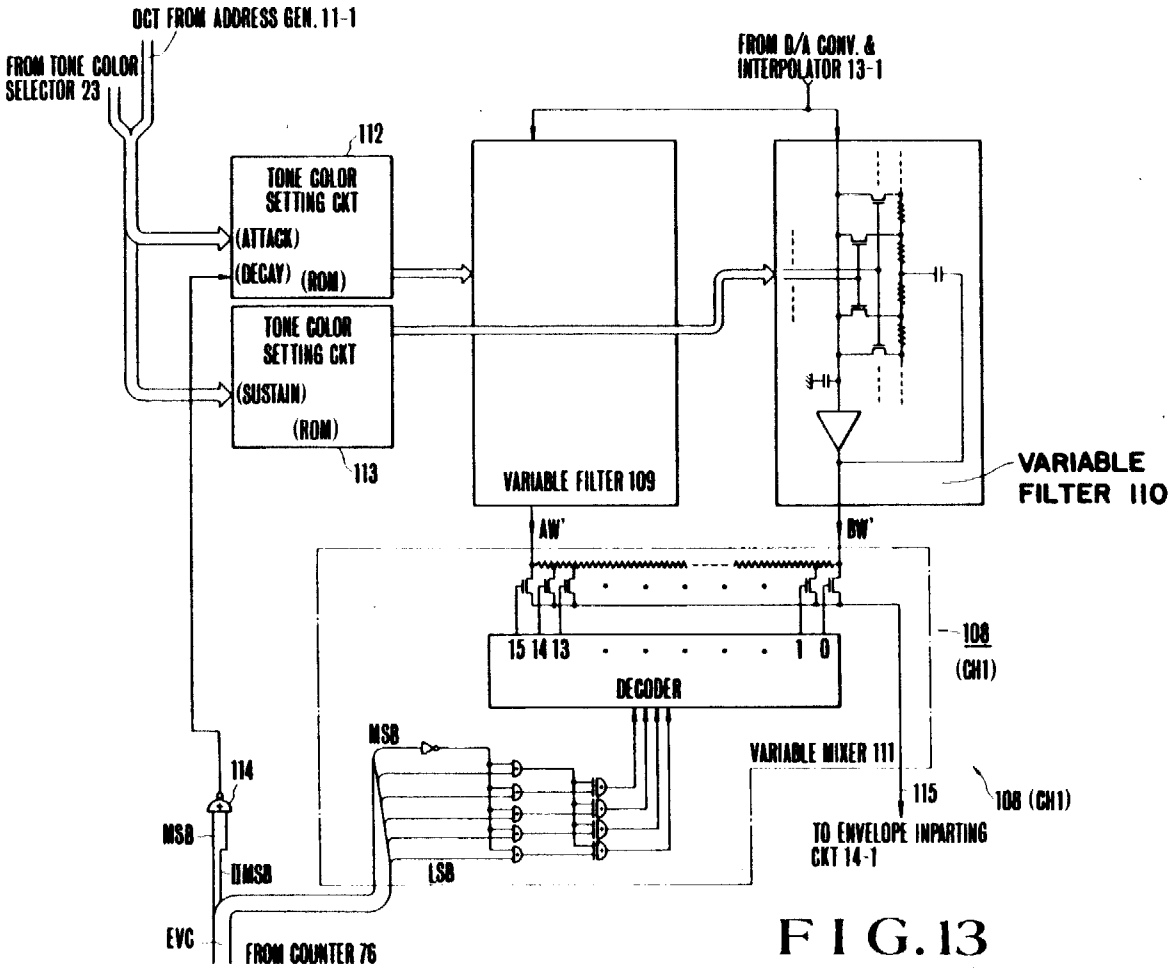
FIG. 13 is a block diagram showing essential portions of a still further modification of this invention.

Although in the embodiment shown in FIG. 9, two or more waveform memory devices (17A, 17B, 17C) were used to provide the variable filter effect, or a variation with time of the tone color (the musical tone waveform), similar change with time of the tone color can also be provided with only one waveform memory device as shown in FIG. 1. FIG. 13 shows one example of the circuit for this purpose. More particularly, a circuit 108 shown in FIG. 13 is inserted in line 108, that is between the digital-analog converting and interpolating circuit 13-1 and the envelope imparting circuit 14-1. Of course, it should be understood that with regard to the other channels CH2 through CH7, circuits identical to circuit 108 shown in FIG. 13 are interposed between the digital-analog converter and interpolator circuits 13-2 through 13-7 and the envelope imparting circuits 14-2 through 14-7.

The circuit 108 comprises variable filters 109 and 110, a variable mixer 111 and tone color setters 112 and 113. The characteristics of the variable filters 109 and 110 are controlled by the control data given by the tone setters 112 and 113 respectively. For example, each variable filter may be constituted by an active filter whose rate of feedback is controlled by switching FET gate circuits shown in the block of the variable filter 110. The tone color setters 112 and 113 comprise ROM's storing the control data for switching the filter characteristics and predetermined control data are read out of the ROM's in accordance with the tone color selected by the tone color selector 23 (FIG. 1) and the octave code OCT generated by the address generators 11-1 (FIG. 1). The reason for applying the octave code OCT to the filter control element is to vary the filter characteristic according to the octave range of the tone generated by the given channel CH1. Tone color setters 112 and 113 are set such that different control data are read out to give different characteristics to the variable filters 109 and 110. One tone color setter 112 sets the characteristic of the variable filter 109 such that it can produce a tone color for use in the attack or decay, while the other tone color setter 113 sets the variable filter 110 such that it can produce a steady tone color (for use in sustain).

Tone color setter 112 is constructed such that it can read out either one of the attack control data and the decay control data depending upon the state of the envelopes. More particularly, the output EVC of the counter (FIG. 8) in the envelope imparting circuit 14-1 is applied to the circuit 108 shown in FIG. 13, the upper order two bits (MSB and a bit IIMSB next thereto) being inputted to a NOR gate circuit 114. During the attack of the envelope, since the upper order two bits are "00" as above pointed out the output of the NOR gate circuit 114 becomes "1". During the first decay, sustain or the second decay "1" is included in the MSB or the next lower bit IIMSB so that the output of the NOR gate circuit 114 would become "0" which is supplied to the tone color setter 112 and when its output becomes "1", that is at the time of attack, an attack control data is read out, whereas when the output is "0", that is other than the attack, a decay control data would be read out.

An analog musical tone signal produced by the digital-analog converter and interpolator circuit 13-1 (FIG. 1) is inputted to the variable filters 109 and 110. In this modification, it is advantageous to store a waveform containing a larger amount of harmonic components in the waveform memory device 17 (FIG. 1). A musical tone signal containing a large amount of harmonic components and respectively inputted to variable filters 109 and 110 is filtered according to the filter characteristics set by the tone color setters 112 and 113 respectively thereby producing musical tone signals AW' and BW' having different tone colors from filters 109 and 110. The musical tone signal AW' produced by one variable filter 109 has an attack tone color during the attack, whereas during the first decay, the sustain or the second decay, the tone color is switched to a decay tone color. The musical tone signal BW' produced by the other variable filter 110 always has a steady tone color for sustain. The outputs AW' and BW' of the variable filters 109 and 110 are applied to the variable mixer, the ratio of admixing thereof being varied with time, and the mixed output is applied to the envelope imparting circuit 14-1 (FIG. 1) over the line 115.

The variable mixer 111 has the same construction as that of 89-1 shown in FIG. 10. Thus, its ratio of admixture varies in accordance with the data EVC given by the counter 76 and indicative of the enveloper state. More particularly, in the same manner as above described, at the time of attack, the mixing ratio varies gradually from the musical tone signal BW' (steady tone color) to the musical tone signal AW' (attack tone color). During the first decay time the mixing ratio varies gradually from the musical tone signal AW' (decay tone color) to the musical tone signal BW' (steady tone color) whereas during the sustain and the second decay, the signal is sustained at the musical tone signal BW' (steady tone color).

It will be clear that the variable filters 109 and 110 are not limited to active filters of the feedback rate switching type and that such suitable variable filters as voltage control type filters may be employed.

Figure 14:
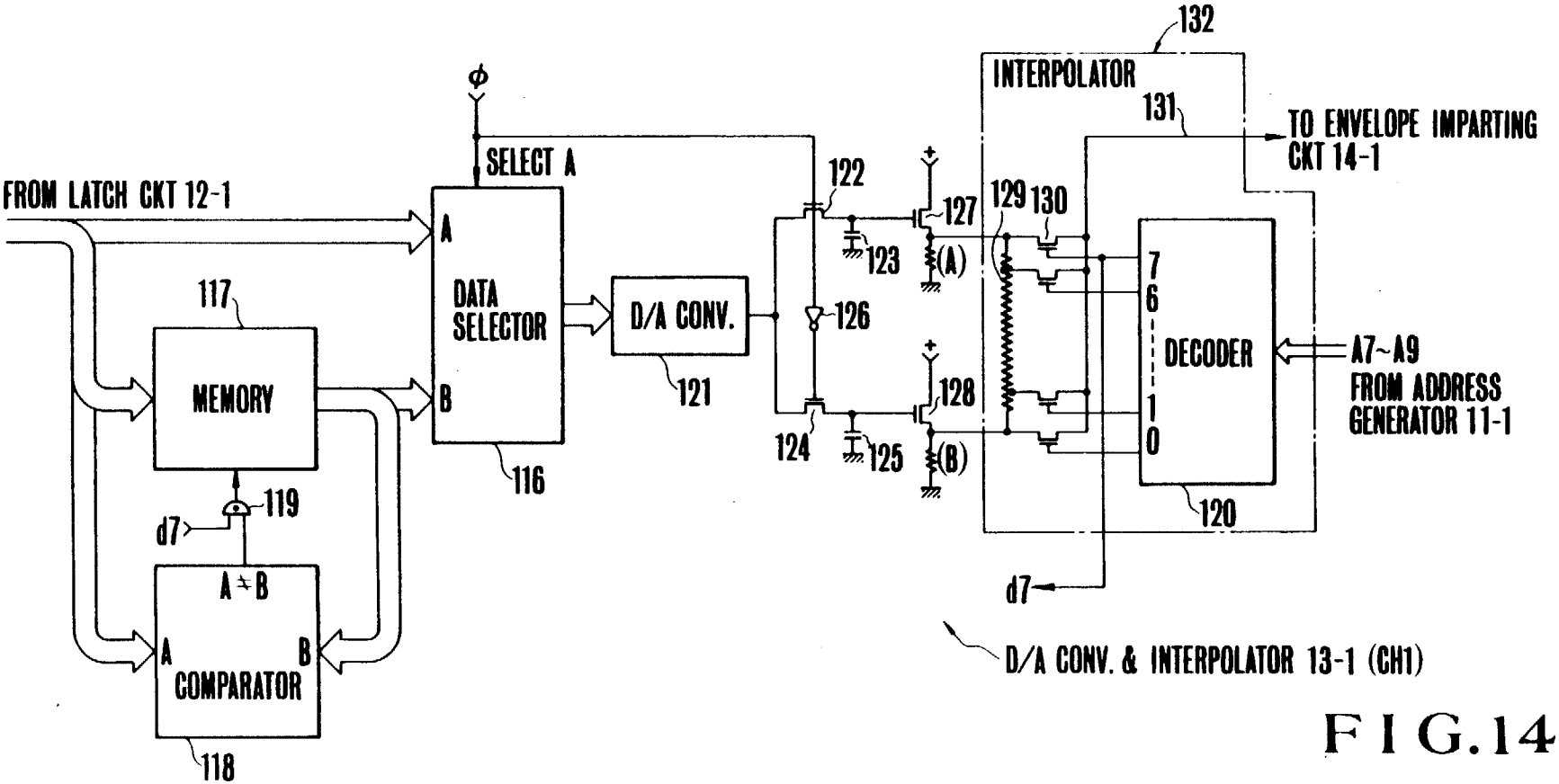
FIG. 14 is a block diagram showing one example of a digital-analog converter and an interpolator circuit.

FIG. 14 shows one example of the digital-analog converter and interpolator circuit 13-1 utilized for the channel CH1 shown in FIG. 1. The digital-analog converter and interpolator circuits 13-2 through 13-7 for the other channels CH2 through CH7, and the digital-analog converter and interpolator circuits 13A-1 and 13B-1 are also constructed in the same manner as that shown in FIG. 14.

In FIG. 14, the waveform sampling point amplitude data supplied from the latch circuit 12-1 (FIG. 1) is applied to one input A of the data selector 116 and to the memory device 117 and the input A of the comparator 118. When a load signal is applied from the AND gate circuit 119, the memory device 117 stores the waveform sampling point amplitude data given by the latch circuit 12-1. The waveform sampling point amplitude data stored in the memory device 17 are applied to the input B of a comparator 118 and the input B of a data selector 116. When the inputs A and B do not coincide with each other (A≠B), the comparator 118 produces an output "1" which is applied to one input of an AND gate circuit 119, the other input thereof being connected to receive a signal d7 from the output (7) of the decoder 120. To the decoder 120 are inputed the lower order 3 bit data A7 through A9 of the address signal from the address generator 11-1 (FIG. 1), and the output (7) of the decoder 120 corresponds to the last step (that is a value "111" of data A7 to A9) among 8 interpolation steps. Consequently, the AND gate circuit 119 is enabled at the last step of one interpolation step. At a time when A≠B, that is when the sampling point amplitude data supplied from the latch circuit 12 does not coincide with the amplitude data stored in the memory device 117, the AND gate circuit 119 produces a load signal, and the sampling point amplitude data supplied from the latch circuit 12-1 are stored in the memory device 117. Immediately thereafter, when the value of the interpolating data A7 through A9 are switched to "100" the values of the address signals are also switched so that the waveform sampling point data given by the latch circuit 12-1 would be switched to the data of a new sampling point. However, the sampling point amplitude data stored in the memory device 117 would not vary up to the last step of interpolation. Accordingly, during an interval between the first step (data A7 to A9="000") and the last step (data A7 to A9="111") of one interpolation step an amplitude data corresponding to the present sampling point would be supplied to the input A of the data selector 116 but the amplitude data of an immediately preceding sampling point would be supplied to the input B of the data selector 116 from the memory device 117.

A clock pulse $\phi$ is supplied to the selection control input of the data selector 116. When this clock pulse $\phi$ is "1" the present sampling point amplitude data applied to the input A is selected by the selector 116 and inputted to the digital-analog converter 121. When the clock pulse $\phi$ is "", the preceding sampling point amplitude data supplied to input B is selected and applied to the digital-analog converter 121. Thus this converter converts on the time division basis the present and preceding sampling point amplitude data into an analog signal.

The output of the digital-analog converter 121 is applied to capacitors 123 and 125 respectively via gate circuits 122 and 124 to be held therein. The clock pulse $\phi$ is applied to the gate circuit 122 where as a signal obtained by inverting the clock pulse $\phi$ with an inverter 126 is applied to the gate circuit 124. Consequently, when the clock pulse $\phi$ "1", the present sampling point amplitude voltage produced by the digital-analog converter 121 is held by capacitor 123 via the gate circuit 122. On the other hand, when the clock pulse $\phi$ is "0" a preceding sampling point amplitude voltage produced by the digital-analog converter 121 would be held by capacitor 125 through the gate circuit 124.

The voltages held by capacitors 123 and 125 are applied to the opposite ends of a resistor 129 of an interpolator 132 through source follower type field effect transistors 127 and 128 respectively. A gate circuit group 130 is connected to the resistor 129 and the conductivity of the gate circuit of group 130 is sequentially switched according to the outputs 0 through 7 of the decoder 120. Thus, while the interpolation data A7 to A9 vary from the first step "000" to the last step "111", the output of the decoder 120 sequentially varies from 0 to 7 to send to line 131 a waveform amplitude voltage A obtained by interpolating at 8 steps during an interval of from the preceding sampling point amplitude voltage B to the present sampling point amplitude voltage A. The signal on the line 131 is inputted to the envelope imparting circuit 14-1 (see FIG. 1).

Figure 15:
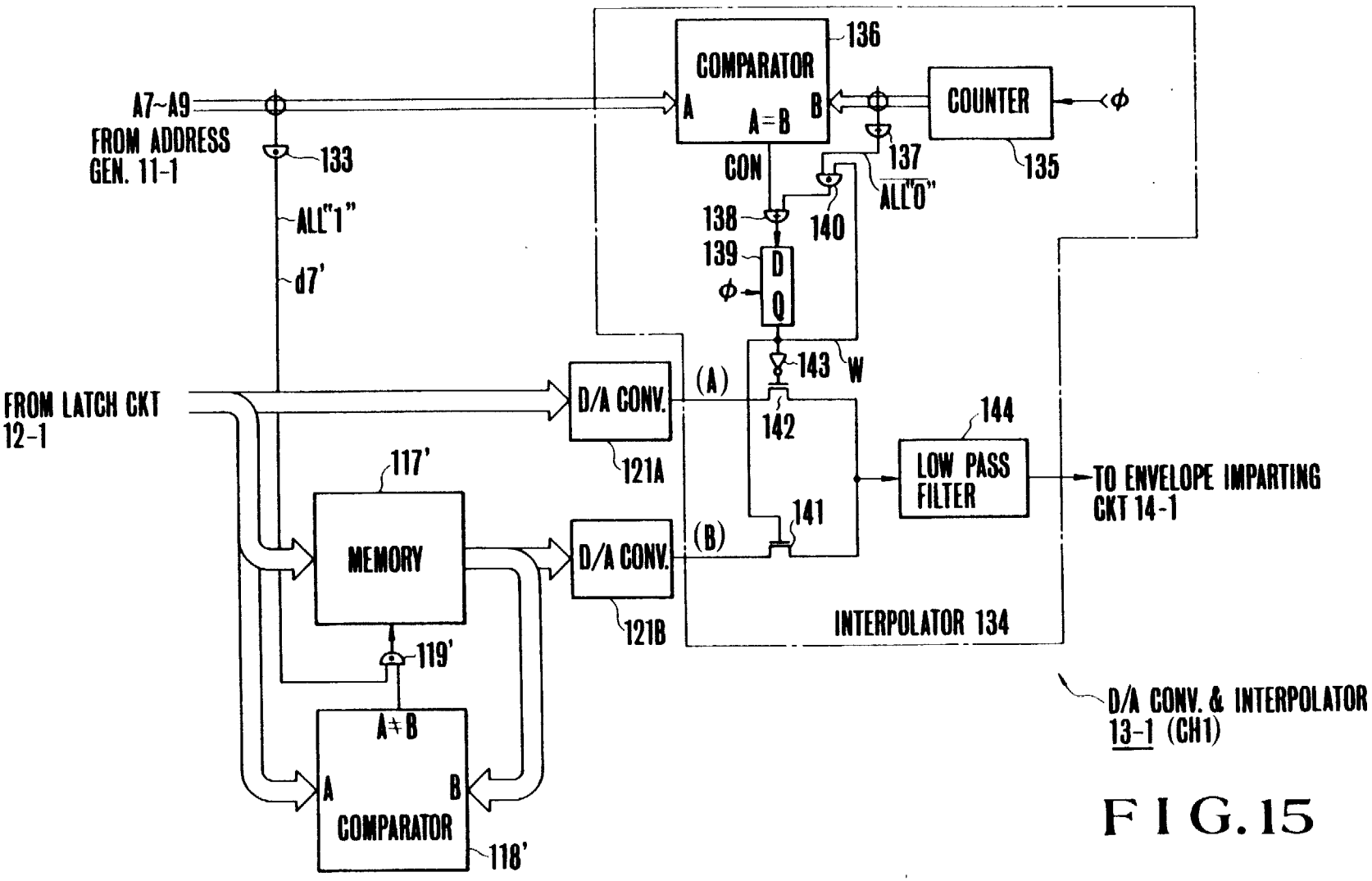
FIG. 15 is a block diagram showing other examples of the digital-analog converter and interpolator circuit.

FIG. 15 illustrates another example of the digital-analog converter and interpolator circuit 13-1. A memory device 117', a comparator 118' and an AND gate circuit 119' operate in the same manner as the memory device 117, comparator 118 and AND gate circuit 119 shown in FIG. 14. However, the signal d7' supplied to the AND gate circuit 119' is produced by an AND gate circuit 133 inputted with interpolation address data A7 to A9. When 3-bit interpolation address data A7 to A9 are all "1", that is at the last step of one interpolation step, the signal d7' becomes "1". Although in FIG. 14, the digital-analog converter 121 is used on the time division basis, in the modification shown in FIG. 15, two digital-analog converters 121A and 121B are provided, one 121A being used to convert the amplitude data from the latch circuit 12-1 into an analog value to obtain an analog voltage A of the present sampling point amplitude which the other 121B being used to convert the amplitude data from the memory device 117' into an analog value to obtain an analog voltage B of the preceding point amplitude.

An interpolator 134 is provided to interpolate data in an interval between two adjacent sampling point amplitudes A and B given by the digital-analog converters 121A and 121B by utilizing an interpolation method different from that of the interpolator 132 shown in FIG. 14.

In the interpolator 134, a 3-bit binary counter 135 counts at a high speed the clock pulse $\phi$ and its count output is sent to the input B of the comparator 136. A 3-bit output of the counter 135 is applied to an OR gate circuit 137. When the three bit outputs of the counter 135 are all "0" the OR gate circuit 137 produces an output "0" whereas "1" when the 3-bit outputs are other than all "0". The manner of counting the counter 135 is shown in FIG. 16(a) and the output ALL "0" of the OR gate circuit 137 is shown in FIG. 16(b).

To the input A of the comparator 136 are supplied 3-bit interpolation address data A7 through A9 from the address generator 11-1 (FIG. 1). When both inputs A and B of the comparator coincide with each other a coincidence detection signal CON is produced. The rate of variation of the count of the counter 135 applied to input B is much faster than that of the interpolation address data A7 to A9. Consequently, when the interpolation address data A7 to A9 assume a certain value, each time the count of the counter 135 reaches this value, the coincidence detection signal would be generated repetitively. The coincidence detection signal CON is applied to a delay flip-flop circuit 139 via an OR gate circuit 138, and after being delayed by one clock pulse, outputted from the delay flip-flop circuit 139. The output W thereof is applied to an AND gate circuit 140 together with the output ALL "0" of the OR gate circuit 137 and also to the input of a gate circuit 141. The output W is inverted by an inverter 143 and then applied to the input of a gate circuit 142. The output of the AND gate circuit 140 is applied to one input of the OR gate circuit.

The preceding sampling point amplitude voltage B is applied to one gate circuit 141, while the present sampling point amplitude voltage A is applied to the other gate circuit 142. As a consequence, when the output signal W of the delay flip-flop circuit 139 becomes "1" the gate circuit 141 is enabled to apply the preceding sampling point amplitude voltage B to a low pass filter 144. On the other hand when the signal W is "0" the gate circuit 142 is enabled to apply the present sampling point amplitude voltage A to a low pass filter 144.

Figure 16:
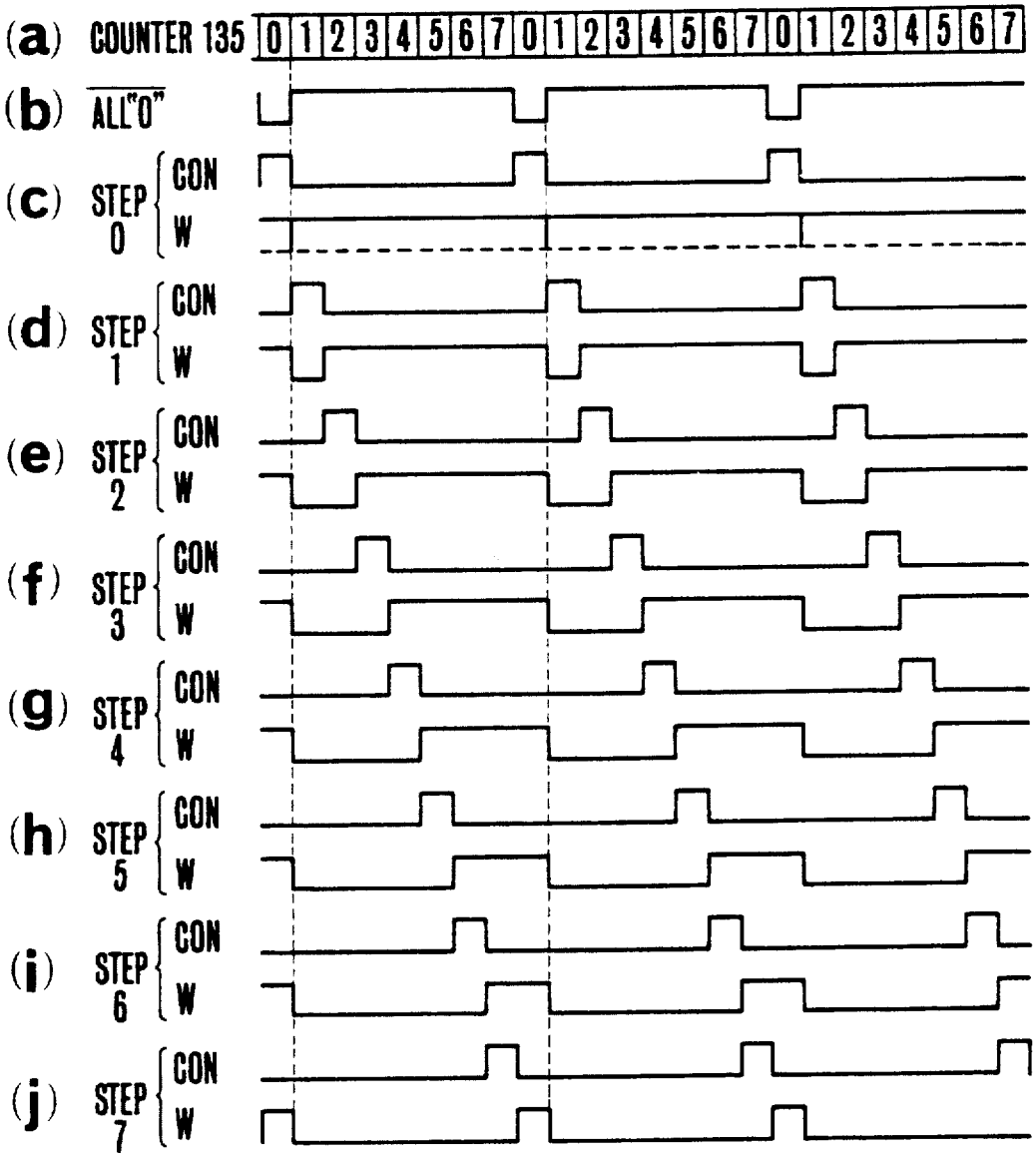
FIGS. 16(a) through 16(j) are timing charts useful to explain the operation of the interpolator shown in FIG. 15.

As shown in FIG. 16(c), when the interpolation address data A7 to A9 become "000", a coincidence detection signal CON is produced each time the count of the counter 135 becomes [0] . When a signal W which is obtained by delaying 1 bit the signal CON is applied to the AND gate circuit 140, the AND gate circuit 140 is enabled because the count of the counter 135 has been changed to [1] whereby a signal "1" is applied to the delay flip-flop circuit 139 from the AND gate circuit 140 via the OR gate circuit 138. In this manner, the AND gate circuit 140 continues to produce signal "1" until the count of the counter 135 becomes [7]. Thereafter, when the count of the counter 135 becomes [0], a coincidence detection signal CON would be produced. Consequently, signal W is always "1" as shown in FIG. 16c, with the result that the sampling point amplitude voltage B is continuously inputted to the low pass filter 144 and the voltage B is supplied to the envelope imparting circuit 14-1 through the low pass filter 144.

Then, when the interpolation address data A7 to A9 becomes "001" (step 1), the coincidence detection signal CON is produced each time the count of the counter 135 becomes [1] as shown in FIG. 16(d). After one bit time of the coincidence detection signal CON, signal W builds up to "1" thereby enabling the AND gate circuit 140. Thereafter, the AND gate circuit 140 is maintained in the enabled state until the signal ALL "0" (see FIG. 16b) becomes "0". As the count of the counter 135 becomes [0] while at the same time signal ALL "0" becomes "0" the AND gate circuit 140 is disabled, and 1 bit time later signal W becomes "0" (FIG. 16(d)). However, the coincidence detection signal CON is produced at once thus changing again the signal W to "1". In this manner, at the step 1 "0" and "1" of signal are repeated at a ratio of 1:7. In response to these "0" and "1" states of signal W, the amplitude voltages A and B are alternately applied to the low pass filter 144, the output thereof being equal to the mean value of the integrated values of respective voltages A and B. Thus, as the time in which the signal W is "1" is increased, the average value approaches the value of the amplitude voltage B, whereas as the time in which the signal W is "0" is increased, the average value approaches the value of the amplitude voltage A.

Thereafter, as the value of the address data A7 to A9 increases (the interpolation step advances as 2, 3 . . . 7), a coincidence detection signal CON is generated each time the count of the counter 135 becomes the value equal to the step number as shown in FIG. 16(e) through 16(j), respectively, thus increasing the ratio of "0" of signal W. Thus, between the interpolation steps 0 and 7, the amplitude voltage produced by the low pass filter 144 varies gradually from the preceding sampling point amplitude voltage B to the present sampling point amplitude voltage A, meaning an interpolation.

In FIGS. 14 and 15 the interpolators 132 and 134 may be interchanged.

Although in the foregoing embodiments, as the waveform memory devices 17, 17', 17A, 17B and 17C, were used memory devices that store digital amplitude data it is also possible to use memory devices that store analog amplitude data, in which case analog signal sample/-hold circuits are used.

In the embodiments shown in FIGS. 1, 2 and 4, a key assigner 20 was described to send out on the time division basis the key code KC and the key-on signal KON of respective channels, these signals may be sent out on the not time division basis. Furthermore, the address generators 11-1 through 11-7 may be constructed to be used in common on the time division basis so as to generate address signals of respective channels on the time division basis.

Where a source follower type field effect transistor is included in the output line 103 or 115 of the variable mixer 89-1 or 111 shown in FIG. 10 or 13, it is possible to reduce the capacity (size) of the mixing ratio switching gate circuits G0 through G15, which is advantageous to fabricate the electronic musical instrument with integrated circuits. Thus, reduction in the size of the gate circuits G0 through G15 means increase of their output impedance, since the input impedance of the source follower type circuit is sufficiently high there is no fear of level attenuation thus obviating problems caused by decreasing the size of the gate circuits G0 through G15.

In the foregoing embodiments, each of the address signals A1 through A6 for reading out the waveform was made to comprise 6 bits so as to read out a musical tone waveform over one period by using $2^6=64$ addresses. In this case harmonic components up to $2^6/2=32$ can be contained in the read out output. Assume that one sampling point amplitude data stored in one address is a 6-bit data, the capacity of a ROM (or RAM) required to store one waveform would be $2^66=64\times6$ bits. Where harmonics of higher orders are necessary, for example to obtain 64 harmonics, the number of bits of an address signal may be increased by one bits that is to 7 bits, but the capacity of the ROM or RAM becomes $2^7\times6=128=6$ bits which is uneconomical. Increase in the harmonics can be solved in the following manner. More particularly, one sampling point amplitude data is increased by 1 bit to 7 bits and one of the bits is used as an interpolation inhibit bit when this bit is "1". Where the interpolation inhibit bit is set to be "1" at a sampling point where the amplitude varies greatly (for example the fly-back portion of a saw tooth waveform) the interpolation would be inhibited at that portion whereby the waveform becomes steep thus increasing the harmonic component. However the capacity of the ROM or RAM remains at $2^6\times7=64\times7$ bits, meaning no appreciable increase in the capacity.

As above described, according to this invention, since a waveform data source is commonly used for various musical tone generating channels it is possible to simplify the circuit construction and to save the cost. Moreover, the waveform (or tone) switching device can be simplified. Moreover since the waveform data read out on the time division basis are converted on the non time division basis into continuous signals for respective channels and then used to produce musical tones, it is possible to eliminate the problems of interchannel interference and aliasing noise caused by time division. By latching (or converting into continuous signal) in synchronism with (or in harmony with) the pitch of the musical tone it is possible more accurately remove non-harmonic components such as time division clock component. There is an additional advantage that musical tone waveforms that vary with time can be produced for discrete channels by using only two waveform data sources.

What is claimed is:

[1. An electronic musical instrument comprising:

a plurality of address generators for respectively producing address signals corresponding to different tones, each of said address signals being varied at a rate synchronous with the frequency of the corresponding one of said different tones;

a waveform memory device including a plurality of addresses for respectively storing a plurality of waveform sample values that constitute a waveform at respective ones of said addresses;

means for sequentially supplying one after another of said address signals sent from said address generators to said waveform memory device so that said waveform is read out at different rates in a time division multiplexing manner respectively corresponding to said address signals supplied for said different tones to be produced; and musical tone forming means for forming musical tones in accordance with respective time division multiplexed waveform outputs from said waveform memory device.]

[2. An electronic musical instrument as defined in claim 1 wherein said musical tone forming means comprises:

a plurality of musical tone forming circuits; and a circuit for sequentially distributing one after another of the outputs of said waveform memory device to one after another of said musical tone forming circuits so that different ones of said musical tones are produced by different ones of said plurality of musical tone forming circuits.]

[3. An electronic musical instrument as defined in claim 2 wherein each one of said musical tone forming circuits comprise a latch circuit for receiving the output of said distributing circuit, the latch circuit being connected to a corresponding one of said plurality of address generators to perform a latching operation in accordance with a corresponding address signal.]

[4. An electronic musical instrument as defined in claim 1 wherein said waveform memory device comprises a ROM.

[5. An electronic musical instrument as defined in claim 1 wherein said waveform memory device comprises:

a RAM;

a write circuit for writing into said RAM waveform sample values of a musical tone waveform; and a control circuit for determining a write mode and a read out mode of said RAM, said control circuit enabling said write circuit to apply an output of said write circuit to said RAM at the time of the write mode, and sequentially applying address signals generated by said plurality of address generators to said RAM at the time of the read out mode.]

[6. An electronic musical instrument as defined in claim 1 wherein said supplying means comprises:

an address counter for counting a high speed clock for sequentially sending out a plurality of address signals; and means for forming a signal related to the address counter outputs and respective address outputs of said address generators;

and wherein said waveform memory device comprises;

means for forming a plurality of waveform sample values which constitute a musical tone waveform to be formed according to the address counter outputs; and means responsive to said related signal of said supplying means for selecting said waveform sample values which are sent to said musical tone forming means.]

7. An electronic musical instrument [according to claim 1] *comprising:*

*a plurality of address generators for respectively producing address signals corresponding to different tones, each of said address signals being varied at a rate synchronous with the frequency of the corresponding one of said different tones;*

*a waveform memory device including a plurality of addresses for respectively storing a plurality of waveform sample values that constitute a waveform at respective ones of said addresses;*

*means for sequentially supplying one after another of said address signals sent from said address generators to said waveform memory device so that said waveform is read out at different rates in a time division multiplexing manner respectively corresponding to said address signals supplied for said different tones to be produced; and*

*musical tone forming means for forming musical tones in accordance with respective time division multiplexed waveform outputs from said waveform memory device;* wherein said waveform memory device comprises a plurality of waveform memory circuits each storing a plurality of waveform sample values that constitute a waveform different from the waveforms represented by the sample values stored in the other waveform memory circuits;

and wherein said musical tone forming means comprises for each of the tones to be produced a plurality of musical tone forming circuits and a plurality of distributing circuits which sequentially distribute to said musical tone forming means one set after another of the outputs of said waveform memory circuits, where each set consists of waveform sample values delivered simultaneously for each tone, each of said musical tone forming circuits including a variable mixer which receives said one set of the outputs of said waveform memory circuits and then admixes said outputs at a predetermined ratio for forming a musical tone.

8. An electronic musical instrument [according to claim 1] *comprising:*

*a plurality of address generators for respectively producing address signals corresponding to different tones, each of said address signals being varied at a rate synchronous with the frequency of the corresponding one of said different tones;*

*a waveform memory device including a plurality of addresses for respectively storing a plurality of waveform sample values that constitute a waveform at respective ones of said addresses;*

*means for sequentially supplying one after another of said address signals sent from said address generators to said waveform memory device so that said waveform is read out at different rates in a time division multiplexing manner respectively corresponding to said address signals supplied for said different tones to be produced; and*

*musical tone forming means for forming musical tones in accordance with respective time division multiplexed waveform outputs from said waveform memory device,* wherein said musical tone forming means comprises:

plurality of musical tone forming circuits; and a circuit for sequentially distributing one after another of the outputs of said waveform memory device to one after another of said musical tone forming circuits;

and wherein each musical tone forming circuit comprises:

a plurality of filters having different characteristics and connected to commonly receive outputs of said waveform memory device; and a variable mixer for admixing outputs of said filters at a predetermined ratio to form a musical tone.

9. An electronic musical instrument according to claim 7 or 8 wherein said variable mixer comprises:

a voltage divider having input points connected to receive at least two types of waveform signals and a plurality of gate circuits connected between respective ones of said voltage dividing points and an output terminal whereby a mixing ratio of a waveform signal to be delivered from said output terminal is changed by switching the conduction states of said gate circuits.

[10. An electronic musical instrument comprising:

a plurality of address generators for producing address signals corresponding to different tones, said address signals being produced at rates respectively synchronous with frequencies of the respective tones;

an address counter for sequentially producing a plurality of address signals by counting a high speed clock;

means for forming a plurality of waveforms to be formed based on outputs of said address counter;

a plurality of coincidence circuits which check coincidences of the address counter outputs and respective address signals of said address generators;

means responsive to each of the outputs of the respective coincidence circuits for selecting one of the waveform sample values; and musical tone forming means for forming musical tones according to the outputs of said selecting means.]

*11. An electronic musical instrument comprising:*

*pitch designating means for designating pitches of musical tone signals corresponding to musical tones to be produced:*

*musical tone signal producing means for producing, on a time division basis, a plurality of musical tone signals having said designated pitches on a plurality of tone production channels at a predetermined certain common rate;*

*timing signal generating means for producing timing control signals corresponding to said designated pitches;* memory means having a plurality of memory regions for storing said musical tone signals from said musical tone producing means in corresponding memory regions;

*means for outputting the contents of said memory regions in synchronism with said corresponding timing control signals; and*

*means for receiving the outputted contents of the memory regions and producing corresponding tones in which all amplitude changes are harmonic with said timing control signals.*

*12. An electronic musical instrument comprising:*

*pitch designating means for designating a pitch of a musical tone to be produced;*

*start signal generating means for generating a start signal representing a start of production of said musical tone;*

*first tone signal generating means for generating sequentially a plurality of tone signals in accordance with a control signal under the condition that any two ones of said plurality of tone signals are never simultaneously generated, each of said plurality of tone signals having said designated pitch;*

*control signal generating means for generating said control signal;*

*second tone signal generating means for generating a second tone signal;*

*mixing means connected to said first tone signal generating means and said second tone signal generating means for mixing said second tone signal and each of said tone signals at a mixing ratio which varies according to time length which passes from generation of said start signal and for outputting a musical tone signal; and*

*tone converting means for converting said musical tone signal to said musical tone.*

*13. In a time division multiplex polyphonic musical tone generation system wherein separate selected tones to be generated are assigned to different time division multiplex time slots with respect to other tones including non-harmonically related tones, the improvement comprising:*

*a first latch into which tone waveshape samples corresponding to different tones are stored on said time division multiplex basis;*

*a second latch into which the stored samples from said first latch are transferred in pitch synchronism with the musical tone being generated, tone generation being accomplished using the contents of said second latch to generate a tone whose components are harmonic with the pitch of the tone.*

*14. A tone generation system according to claim 13 further comprising:*

*transfer means for transferring said stored samples from said first latch to said second latch at time intervals of* $t_s$ *where* $1/nt_s$ *corresponds to the fundamental frequency of the musical tone being generated, and n is an integer.*

*15. In a time division multiplex musical tone generation system wherein separate selected tones to be generated are assigned to different time division multiplex time slots with respect to other tones including non-harmonically related tones, the improvement comprising:*

*a first latch,*

*first means for entering tone waveshape samples into said first latch on a time division multiplex basis,*

*a second latch,*

*second means, connected to said first and second latches, for transferring the samples from said first latch into said second latch in synchronism with the pitch of the musical tone being generated, and*

*output means for producing musical tones using the contents of said second latch such that the amplitude value of a musical tone changes only in harmony with the pitch of the musical tone.*

*16. In a time division multiplex polyphonic electronic musical tone generation system in which separate selected tones to be generated are assigned to different time division*

*multiplex time slots with respect to other tones including non-harmonically related tones, the improvement comprising:*

*demultiplexing storage means into which time division multiplexed data representing tone waveshape samples for each tone are stored at a time division multiplex rate which is inharmonic with the pitch of at least one tone to be generated; and*

*pitch harmonic sound output means (a) for receiving the waveshape sample data for each tone from the storage means at rates which are harmonic with the pitch of each respective tone and (b) for providing corresponding output sound samples at rates which are harmonic with the pitch of each respective tone.*

* * * * *